US012638301B2

(12) United States Patent
Tasaki

(10) Patent No.: US 12,638,301 B2
(45) Date of Patent: May 26, 2026

(54) DATABASE GENERATION METHOD, DATABASE GENERATION DEVICE, NON-TRANSITORY COMPUTER READABLE STORAGE MEDIUM, DATA ANALYSIS METHOD, AND DATA ANALYSIS DEVICE

(71) Applicant: Panasonic Intellectual Property Corporation of America, Torrance, CA (US)

(72) Inventor: Nobuaki Tasaki, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 161 days.

(21) Appl. No.: 18/405,480

(22) Filed: Jan. 5, 2024

(65) Prior Publication Data

US 2024/0183683 A1 Jun. 6, 2024

Related U.S. Application Data

(63) Continuation of application No. PCT/JP2022/027140, filed on Jul. 8, 2022.

(30) Foreign Application Priority Data

Jul. 14, 2021 (JP) ................................. 2021-116656

(51) Int. Cl.
*G01C 21/00* (2006.01)
*G06F 16/29* (2019.01)
*G07C 5/00* (2006.01)

(52) U.S. Cl.
CPC ......... *G01C 21/3815* (2020.08); *G06F 16/29* (2019.01); *G07C 5/008* (2013.01)

(58) Field of Classification Search
CPC .......... G08G 1/0112; G08G 1/00; G08G 1/01; G08G 1/0104; G08G 1/0108; G08G 1/005;
(Continued)

(56) References Cited

U.S. PATENT DOCUMENTS

2012/0053805 A1* 3/2012 Dantu ................... B60W 40/09
701/70

FOREIGN PATENT DOCUMENTS

JP        2006-092159           4/2006
JP        2006092159 A   *   4/2006
JP        2019-138876           8/2019

OTHER PUBLICATIONS

Jean et al. "Road Roughness Crowd-Sensing with Smartphone Apps", 2019 IEEE Intelligent Transportation Systems Conference (ITSC), Oct. 2019 pp. 1079-1084 (Year: 2019).*
(Continued)

*Primary Examiner* — Brian A Zimmerman
*Assistant Examiner* — Anthony D Afrifa-Kyei
(74) *Attorney, Agent, or Firm* — GREENBLUM & BERNSTEIN, P.L.C.

(57) ABSTRACT

According to the present invention, a computer: acquires state information indicating types and locations of a plurality of mobility devices traveling on one or more roads in a predetermined area; for each of the one or more roads, calculates, on the basis of the state information and for each of the types of the plurality of mobility devices, travel comfortableness indicating how high the comfortableness is when traveling in each type of mobility device on each road among the one or more roads; and generates a database that associates, for each of the one or more roads, the type of the plurality of mobility devices with the travel comfortableness when traveling in the type of mobility device on each road.

18 Claims, 11 Drawing Sheets

(58) Field of Classification Search

CPC .... G08G 1/166; G08G 1/0145; G08G 1/0137; G08G 1/012; G08G 1/0125; G08G 1/0129; G08G 1/0133; G08G 1/052; G08G 1/096716; G08G 1/096741; G08G 1/096775; G08G 1/09; G08G 1/0969; G06Q 50/30; G06Q 50/40; G06N 20/00; G06N 20/10; G06N 20/20; G06F 18/2413; G06K 9/627; G01C 21/34; G01C 21/00; G01C 21/26; G01C 21/3407; G01C 21/3446; G01C 21/3453; G01C 21/36; G01C 21/3822; G01C 21/38; G01C 21/3804; G01C 21/3807; G01C 21/3815; G01C 21/3819; G01C 21/3841; G01C 21/3461; G01C 21/3415; G01C 21/3691; G01C 21/20; G16Y 10/40; G16Y 40/60; G05D 1/0022; G05D 1/00; G05D 1/0011; G05D 1/0217; G05D 1/435; G05D 1/40; G05D 1/43; G05D 1/0212; G05D 1/0214; G05D 1/0274; G05D 1/246; G05D 1/617; G05D 1/639; G05D 1/646; G01N 27/407; A61G 5/045; A61G 5/04; A61G 5/105176; A61G 2203/14; A61G 2203/22; A61G 2203/30; B60W 2552/15; B60W 2552/35

See application file for complete search history.

(56) References Cited

OTHER PUBLICATIONS

International Search Report issued in International Pat. Appl. No. PCT/JP2022/027140, dated Sep. 20, 2022, along with an English translation thereof.

Jean et al., "Road Roughness Crowd-Sensing with Smartphone Apps", 2019 IEEE Intelligent Transportation Systems Conference (ITSC), Oct. 2019, pp. 1079-1084.

Extended European Search Report (EESR) from European Patent Office (EPO) in European Patent Appl. No. 22842060.0, dated Sep. 6, 2024.

* cited by examiner

TERMINAL DEVICE                                                    2

INPUT UNIT                                                        22

DISPLAY UNIT                                                      23

COMMUNICATION UNIT                                               24

CONTROL UNIT                                                     21

| LINK ID | END POINT COORDINATES | DISTANCE (m) |
|---------|----------------------|--------------|
| 121021  |                      |              |
| 121022  |                      |              |
| 121023  |                      |              |

FIG.8

| AREA ID | CENTER COORDINATES |
|---------|--------------------|
| A[1,1]  |                    |
| A[1,2]  |                    |
| A[1,3]  |                    |

FIG.9

| LINK ID | TYPE | TRAVEL COMFORTABLENESS |
|---------|------|------------------------|
| 131011 | LARGE AUTOMOBILE | R11 |
| 131011 | NORMAL AUTOMOBILE | R12 |
| 131011 | SMALL AUTOMOBILE | R13 |
| 131011 | MOTORCYCLE | R14 |
| 131011 | LIGHT VEHICLE | R15 |

FIG.11

START

ACQUIRE STATE INFORMATION    S1

CALCULATE
TRAVEL COMFORTABLENESS    S2

GENERATE
COMFORTABLENESS DATABASE    S3

END

FIG.12

| LINK ID | TYPE | TIME ZONE | TRAVEL COMFORTABLENESS |
|---|---|---|---|
| 131011 | LARGE AUTOMOBILE | MORNING | R111 |
| 131011 | NORMAL AUTOMOBILE | MORNING | R112 |
| 131011 | SMALL AUTOMOBILE | MORNING | R113 |
| 131011 | MOTORCYCLE | MORNING | R114 |
| 131011 | LIGHT VEHICLE | MORNING | R115 |
| 131011 | LARGE AUTOMOBILE | AFTERNOON | R121 |
| 131011 | NORMAL AUTOMOBILE | AFTERNOON | R122 |
| 131011 | SMALL AUTOMOBILE | AFTERNOON | R123 |
| 131011 | MOTORCYCLE | AFTERNOON | R124 |
| 131011 | LIGHT VEHICLE | AFTERNOON | R125 |

FIG.13

| LINK ID | TYPE | ENVIRONMENT | TRAVEL COMFORTABLENESS |
|---|---|---|---|
| 131011 | LARGE AUTOMOBILE | SUNNY | R131 |
| 131011 | NORMAL AUTOMOBILE | SUNNY | R132 |
| 131011 | SMALL AUTOMOBILE | SUNNY | R133 |
| 131011 | MOTORCYCLE | SUNNY | R134 |
| 131011 | LIGHT VEHICLE | SUNNY | R135 |
| 131011 | LARGE AUTOMOBILE | RAINY | R141 |
| 131011 | NORMAL AUTOMOBILE | RAINY | R142 |
| 131011 | SMALL AUTOMOBILE | RAINY | R143 |
| 131011 | MOTORCYCLE | RAINY | R144 |
| 131011 | LIGHT VEHICLE | RAINY | R145 |

DATABASE GENERATION METHOD, DATABASE GENERATION DEVICE, NON-TRANSITORY COMPUTER READABLE STORAGE MEDIUM, DATA ANALYSIS METHOD, AND DATA ANALYSIS DEVICE

TECHNICAL FIELD

The present disclosure relates to a technique for generating a database and a technique for extracting predetermined data satisfying an extraction condition from a database.

BACKGROUND ART

In recent years, with development of an automatic driving system and MaaS (mobility as a service), it is required to collect a usage status of a mobility device in more detail and with high accuracy.

For example, Patent Literature 1 discloses that a traveling state of a vehicle on a road that is not included in map information is acquired, and in a case where the traveling state is determined to satisfy a predetermined registration criterion, the road on which the vehicle travels is determined to be one on which a vehicle can be driven comfortably, and the road is added to map information.

However, in the above-described conventional technique, it is not possible to grasp comfortableness when traveling on a road in a predetermined area in a mobility device for each type of mobility device. For this reason, in a case of moving in a predetermined area, it is not possible to grasp which type of mobility device should be used and on which road one should travel in order to move comfortably.

CITATION LIST

Patent Literature

Patent Literature 1: JP 2019-138876 A

SUMMARY OF INVENTION

The present disclosure has been made to solve the above problem, and an object of the present disclosure is to provide a technique of generating a database in which comfortableness of when traveling on a road in a predetermined area in a mobility device can be collected for each type of mobility device.

A database generation method according to an aspect of the present disclosure includes: by a computer, acquiring state information indicating a type and a location of a plurality of mobility devices traveling on one or more roads in a predetermined area; for each of the one or more roads, calculating, based on the state information and for each of types of the plurality of mobility devices, travel comfortableness indicating how high comfortableness is when traveling in each type of mobility device on each road among the one or more roads; and generating a database that associates, for each of the one or more roads, the type of the plurality of mobility devices with the travel comfortableness when traveling in the type of mobility device on each road.

BRIEF DESCRIPTION OF DRAWINGS

FIG. 6 is a diagram illustrating an example in which a region indicated by map information is divided into a plurality of areas.

FIG. 7 is a diagram illustrating an example of link information.

FIG. 8 is a diagram illustrating an example of area information.

FIG. 9 is a diagram illustrating an example of a comfortableness database.

FIG. 11 is a flowchart for explaining database generation operation of the server device.

FIG. 12 is a diagram illustrating another example of the comfortableness database.

FIG. 13 is a diagram illustrating another example of the comfortableness database.

DESCRIPTION OF EMBODIMENTS

Knowledge Underlying Present Disclosure

Figure 1:
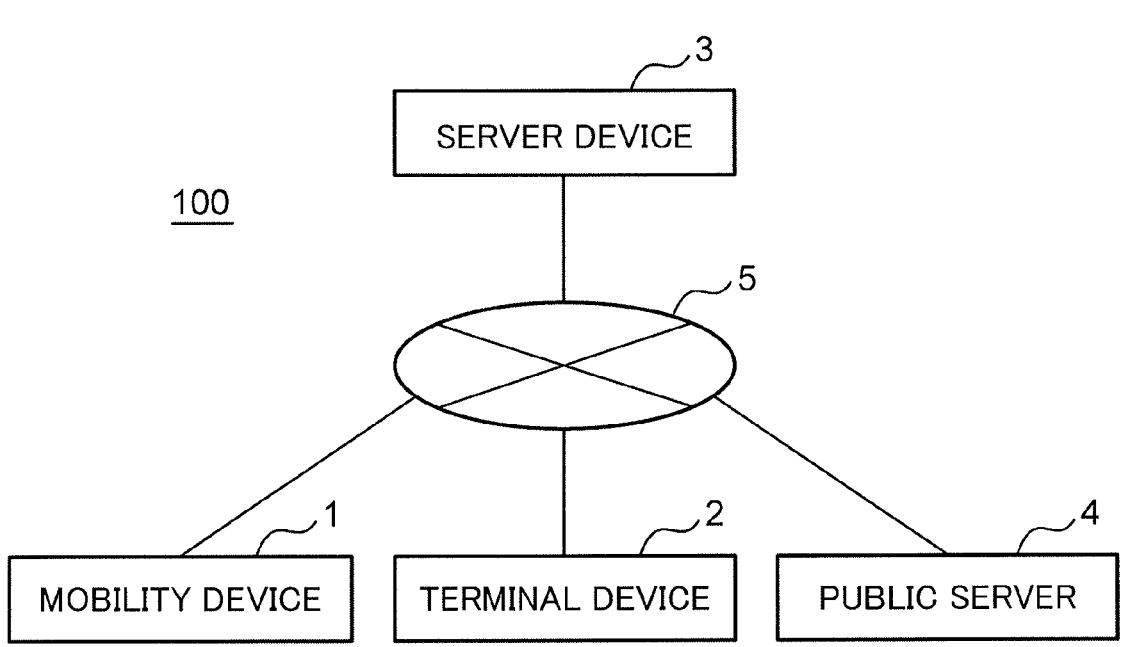
FIG. 1 is a diagram illustrating an overall configuration of a mobility device management system according to an embodiment of the present disclosure.

A light vehicle, a motorized bicycle (motorcycle), and the like may be prescribed by law to travel on the edge side of a road at a lower speed than an automobile. In this case, a light vehicle, a motorized bicycle, and the like often decelerate or greatly change a traveling direction in order to avoid a pedestrian and an automobile parked or stopped on a road, and often causes travel to be less comfortable than that on an automobile even in a case of traveling on the same road.

However, from general map information, although a shape, width, and length of a road in a predetermined area can be grasped, it is not possible to grasp comfortableness when traveling on a road with a mobility device for each type of mobility device. For this reason, in a case of moving in a predetermined area, it is not possible to grasp which type of mobility device should be used and on which road one should travel in order to move comfortably.

In Patent Literature 1, only a road on which a traveling state of a vehicle satisfies a predetermined registration criterion is added to map information, and it is not possible to grasp comfortableness at the time of traveling on a road for each vehicle type from the map information.

(1) In order to solve the above problem, a database generation method according to an aspect of the present disclosure includes: by a computer, acquiring state information indicating a type and a location of a plurality of mobility devices traveling on one or more roads in a predetermined area; for each of the one or more roads, calculating, based on the state information and for each of types of the plurality of mobility devices, travel comfortableness indicating how high comfortableness is when traveling in each type of mobility device on each road among the one or more roads; and generating a database that associates, for each of the one or more roads, the type of the plurality of mobility devices with the travel comfortableness when traveling in the type of mobility device on each road.

According to this configuration, for each of one or more roads in a predetermined area, a database in which a type of a plurality of mobility devices is associated with travel comfortableness of when traveling on each road in the type of mobility device is generated. For this reason, it is possible to collect travel comfortableness of when traveling on each road in a predetermined area in a specific type of mobility device from a generated database.

Further, according to the collected travel comfortableness, it is possible to grasp relatively how high comfortableness each road can be traveled with among one or more roads in a predetermined area by a mobility device of a specific type. By the above, in a case of moving in a predetermined area, it is possible to grasp which type of mobility device should be used and on which road one should travel in order to move comfortably.

(2) Further, in the database generation method according to (1), the state information may further include information indicating a time of when the plurality of mobility devices travel, in the calculation of the travel comfortableness, for each of the one or more roads, a type of the plurality of mobility devices and the travel comfortableness in a time zone in which the plurality of mobility devices travel may be calculated based on the state information, and in the generation of the database, for each of the one or more roads, a type of the plurality of mobility devices, a time zone in which the plurality of mobility devices travel, and the travel comfortableness of when traveling on each road in the type of mobility device in the time zone may be associated.

According to this configuration, for each of one or more roads in a predetermined area, a database in which a type of a plurality of mobility device, a time zone in which the plurality of mobility devices travel, travel comfortableness of when traveling on each road in the type of mobility device in the time zone are associated is generated. For this reason, it is possible to collect travel comfortableness of when traveling on each road in a predetermined area in a specific type of mobility device in a specific time zone from a generated database.

Further, according to the collected travel comfortableness, it is possible to grasp relatively how high comfortableness each road can be traveled with among one or more roads in a predetermined area by a mobility device of a specific type in a specific time zone. By the above, in a case of moving in a predetermined area in a certain time zone, it is possible to grasp which type of mobility device should be used and on which road one should travel in order to move comfortably.

(3) Further, in the database generation method according to (1), the state information may further include information indicating an environment of when the plurality of mobility devices travel on the one or more roads, in the calculation of the travel comfortableness, for each of the one or more roads, a type of the plurality of mobility devices and the travel comfortableness in an environment of when the plurality of mobility device travel may be calculated based on the state information, and in the generation of the database, for each of the one or more roads, a type of the plurality of mobility devices, an environment of when the plurality of mobility devices travel, and the travel comfortableness of when traveling on each road in the type of mobility device in the environment may be associated.

According to this configuration, for each of one or more roads in a predetermined area, a database in which a type of a plurality of mobility devices, an environment of when the plurality of mobility devices travel, travel comfortableness of when traveling on each road in the type of mobility device in the environment are associated is generated. For this reason, it is possible to collect travel comfortableness of when traveling on each road in a predetermined area in a specific type of mobility device in a specific environment from a generated database.

Further, according to the collected travel comfortableness, it is possible to grasp relatively how high comfortableness each road can be traveled with among one or more roads in a predetermined area by a mobility device of a specific type in a specific environment. By the above, in a case of moving in a predetermined area in a certain environment, it is possible to grasp which type of mobility device should be used and on which road one should travel in order to move comfortably.

(4) Further, in the database generation method according to any one of (1) to (3), in the calculation of the travel comfortableness, the travel comfortableness of when each type of mobility device travels on each road included in each area may be calculated based on speed comfortableness based on an average speed of when each type of mobility device travels on each road and straight travel comfortableness based on an average angular velocity and an average acceleration of when each type of mobility device travels on each road.

According to this configuration, the travel comfortableness can be appropriately calculated in consideration of an average speed, an average angular velocity, and an average acceleration of when each type of mobility device travels on each road.

(5) Further, in the database generation method according to (4), in the calculation of the travel comfortableness, the speed comfortableness may be calculated based on an average speed of when each type of mobility device is traveling on each road and sample standard deviation of a speed of when each type of mobility device travels on each road, and the straight travel comfortableness may be calculated based on an average angular velocity and an average acceleration of when each type of mobility device travels on each road, and sample standard deviation of an angular velocity and an acceleration of when each type of mobility device travels on each road.

According to this configuration, the travel comfortableness can be more appropriately calculated in consideration of not only an average speed, an average angular velocity, and an average acceleration of when each type of mobility device travels on each road, but also variation in a speed, an angular velocity, and an acceleration of a mobility device.

(6) Further, in the database generation method according to (1) or (2), in the calculation of the travel comfortableness, the travel comfortableness of when each type of mobility device travels on each road included in each area may be calculated based on speed comfortableness based on an average speed of when each type of mobility device travels on each road, straight travel comfortableness based on an average angular velocity and an average acceleration of when each type of mobility device travels on each road, and environment comfortableness based on an average value of indexes indicating an environment of when each type of mobility device travels on each road.

According to this configuration, the travel comfortableness can be appropriately calculated in consideration of an average speed, an average angular velocity, and an average acceleration, and also an average value of indexes indicating an environment of when each type of mobility device travels on each road.

(7) Further, in the database generation method according to (6), in the calculation of the travel comfortableness, the speed comfortableness may be calculated based on an average speed of when each type of mobility device travels on each road and sample standard deviation of a speed of when each type of mobility device travels on each road, the straight travel comfortableness may be calculated based on an average angular velocity and an average acceleration of when each type of mobility device travels on each road, and sample standard deviation of an angular velocity and an acceleration of when each type of mobility device travels on each road, and the environment comfortableness may be calculated based on an average value of indexes indicating an environment of when each type of mobility device travels on each road and sample standard deviation of an index indicating an environment of when each type of mobility device travels on each road.

According to this configuration, the travel comfortableness can be more appropriately calculated in consideration of not only an average speed, an average angular velocity, and an average acceleration, and an average value of indexes indicating an environment of when each type of mobility device travels on each road, but also variation in each of a speed, an angular velocity, and an acceleration of a mobility device, and an index indicating an environment.

(8) Further, in the database generation method according to (4) or (5), in the calculation of the travel comfortableness, the travel comfortableness may be calculated based on information obtained by excluding, from the state information, information indicating that each type of mobility device travels on each road at a speed equal to or less than a predetermined lower limit speed.

According to this configuration, information acquired when a mobility device is forcibly caused to travel at a low speed equal to or less than the lower limit speed or stop due to traffic congestion, signal waiting, or the like can be excluded from the state information, and travel comfortableness when a plurality of mobility devices normally travel can be appropriately calculated based on the state information.

(9) A database generation device according to another aspect of the present disclosure includes an acquisition unit that acquires state information indicating a type and a location of a plurality of mobility devices traveling on one or more roads in a predetermined area, a calculation unit that calculates, for each of the one or more roads, based on the state information and for each of types of the plurality of mobility devices, travel comfortableness indicating how high comfortableness is when traveling in each type of mobility device on each road among the one or more roads; and a generation unit that generates a database that associates, for each of the one or more roads, the type of the plurality of mobility devices with the travel comfortableness when traveling in the type of mobility device on each road.

According to the present configuration, the same effects as those of the database generation method can be obtained.

(10) A non-transitory computer readable storage medium according to another aspect of the present disclosure is a non-transitory computer readable storage medium storing a database generation program that causes a computer to function to acquire state information indicating a type and a location of a plurality of mobility devices traveling on one or more roads in a predetermined area, for each of the one or more roads, calculate, based on the state information and for each of types of the plurality of mobility devices, travel comfortableness indicating how high comfortableness is when traveling in each type of mobility device on each road among the one or more roads, and generate a database that associates, for each of the one or more roads, the type of the plurality of mobility devices with the travel comfortableness when traveling in the type of mobility device on each road.

According to the present configuration, the same effects as those of the database generation method can be obtained.

(11) A data analysis method according to another aspect of the present disclosure is a data analysis method in a data analysis device that extracts at least one road satisfying an extraction condition from the database generated by the database generation method according to (1), in which the extraction condition includes a type of mobility device and a condition for identifying the travel comfortableness of when traveling on a road in the type of mobility device, the data analysis method includes acquiring the extraction condition, extracting the at least one road satisfying the extraction condition from the database, and outputting analysis result information including the extracted at least one road.

According to this configuration, at least one road that satisfies a type of mobility device and an extraction condition for identifying travel comfortableness of when traveling on a road in the type of mobility device is extracted from the database, and analysis result information including the at least one road is output. For this reason, from the analysis result information, it is possible to easily grasp at least one road on which it is possible to travel in a predetermined area with travel comfortableness identified by the extraction condition in a type of mobility device identified by the extraction condition.

(12) Further, in the data analysis method according to (11), the analysis result information may include a heat map indicating a relationship between each of the at least one road and the travel comfortableness of when traveling on each of the at least one road in a mobility device of a type identified by the extraction condition.

According to this configuration, a heat map indicating a relationship between each of at least one road satisfying an extraction condition and travel comfortableness of when traveling on each of the at least one road in a mobility device of a type identified by the extraction condition is output. For this reason, it is possible to easily grasp travel comfortableness of when traveling on each of at least one road satisfying the extraction condition in a mobility device of a type identified by the extraction condition from the heat map.

(13) A data analysis device according to another aspect of the present disclosure is a data analysis device that extracts at least one road satisfying an extraction condition from the database generated by the database generation method according to (1), in which the extraction condition includes a type of mobility device and a condition for identifying the travel comfortableness of when traveling on a road in the type of mobility device, the data analysis device includes a condition acquisition unit that acquires the extraction condition, an extraction unit that extracts the at least one road satisfying the extraction condition from the database, and an output unit that outputs analysis result information including the extracted at least one road.

According to this configuration, the same effects as those of the data analysis method described above can be obtained.

(14) A non-transitory computer readable storage medium according to another aspect of the present disclosure is a non-transitory computer readable storage medium storing a data analysis program that extracts at least one road satisfying an extraction condition from the database generated by the database generation method according to (1), in which the extraction condition includes a type of mobility device and a condition for identifying the travel comfortableness of when traveling on a road in the type of mobility device, the data analysis program causing a computer to: acquire the extraction condition, extract the at least one road satisfying the extraction condition from the database, and output analysis result information including the extracted at least one road.

According to this configuration, the same effects as those of the data analysis method described above can be obtained.

An embodiment of the present disclosure will be described below with reference to the accompanying drawings. Note that the embodiment below is an example of an embodiment of the present disclosure, and is not intended to limit the technical scope of the present disclosure.

First Embodiment

FIG. 1 is a diagram illustrating an overall configuration of a mobility device management system 100 according to an embodiment of the present disclosure. As illustrated in FIG. 1, the mobility device management system 100 includes a mobility device 1, a terminal device 2, and a server device 3.

The mobility device 1 includes, for example, a large automobile, a normal automobile, a small automobile, a motorcycle (motorized bicycle), and a light vehicle. The light vehicle includes a power-assisted bicycle and a bicycle. The mobility device 1 is driven by the user. The mobility device 1 moves from a departure place to a destination according to a user's instruction. The mobility device 1 can stop at any place. The mobility device 1 is communicably connected to the server device 3 via a network 5 each other. The network 5 is the Internet, for example.

The terminal device 2 is, for example, a smartphone, a tablet computer, or a personal computer, and is used by the user in the mobility device 1 and an administrator of the mobility device management system 100. The terminal device 2 is communicably connected to the server device 3 via the network 5 each other. The terminal device 2 transmits an extraction condition to the server device 3, receives analysis result information from the server device 3, and presents received analysis result information.

The server device 3 is, for example, a web server. The server device 3 is an example of a database generation device and a data analysis device. The server device 3 receives various types of information from the mobility device 1 and the terminal device 2, and transmits various types of information to the mobility device 1 and the terminal device 2.

The server device 3 generates a database based on information received from the mobility device 1. Further, the server device 3 receives an extraction condition from the terminal device 2, extracts information satisfying the received extraction condition from the database, and transmits extracted information to the terminal device 2 as analysis result information.

Note that the mobility device 1, the terminal device 2, and the server device 3 are communicably connected to a public server 4 via the network 5. The public server 4 returns necessary public information in response to an inquiry from the mobility device 1, the terminal device 2, and the server device 3. The public information includes, for example, information indicating a season corresponding to a designated date and time, information indicating weather at a designated date and time, information indicating a date category of a designated date, and the like. The date category is information indicating which one of seven days of the week from Sunday to Saturday or a national holiday the date is.

Figure 2:
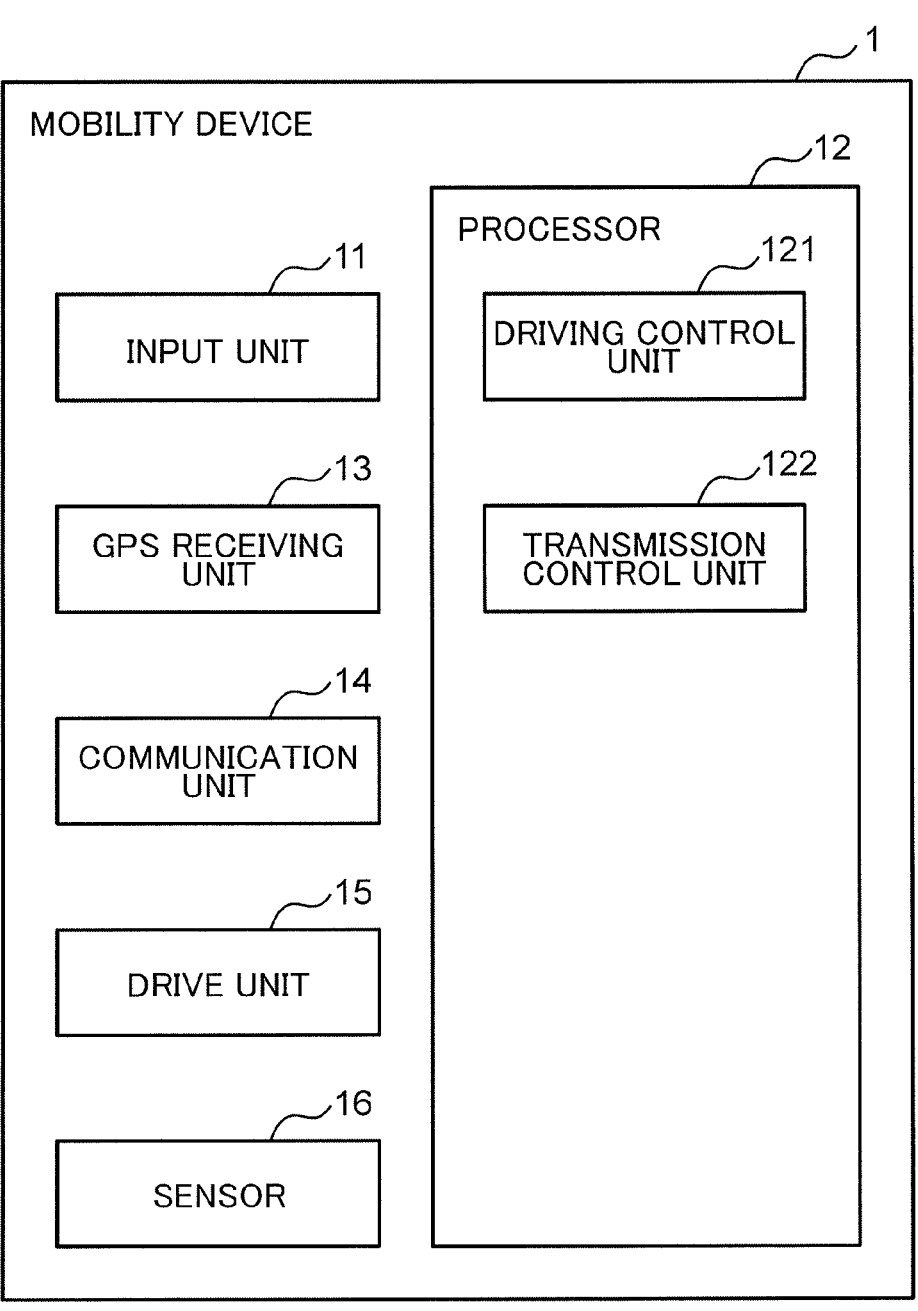
FIG. 2 is a diagram illustrating an example of a configuration of a mobility device according to an embodiment of the present disclosure.

FIG. 2 is a diagram illustrating an example of a configuration of the mobility device 1 according to an embodiment of the present disclosure. As illustrated in FIG. 2, the mobility device 1 includes an input unit 11, a processor 12, a global positioning system (GPS) receiving unit 13, a communication unit 14, a drive unit 15, and a sensor 16.

The input unit 11 receives driving operation of the mobility device 1 by the user.

The GPS receiving unit 13 acquires a current location of the mobility device 1. The current location is represented by latitude and longitude.

The sensor 16 detects various speeds of the mobility device 1.

Specifically, the sensor 16 includes a speed sensor, an angular velocity sensor, and an acceleration sensor. The speed sensor detects a traveling speed of the mobility device 1. The angular velocity sensor detects an angular velocity of the mobility device 1 around a front-rear direction, that is, an angular velocity of the mobility device 1 in a roll direction. Furthermore, the angular velocity sensor detects an angular velocity of the mobility device 1 around a left-right direction, that is, an angular velocity of the mobility device 1 in a pitch direction. Furthermore, the angular velocity sensor detects an angular velocity of the mobility device 1 around a vertical direction, that is, an angular velocity of the mobility device 1 in a yaw direction. The acceleration sensor detects acceleration in three directions of the front-rear direction, the left-right direction, and the vertical direction of the mobility device 1.

The processor 12 is, for example, a central processing unit (CPU), and includes a driving control unit 121 and a transmission control unit 122.

The driving control unit 121 controls the drive unit 15 according to driving operation of the user by the input unit 11 to move the mobility device 1.

While the mobility device 1 is driven, the transmission control unit 122 transmits state information indicating a current state of the mobility device 1 to the server device 3 periodically (for example, every 30 seconds).

The state information includes a mobility device ID for identifying the mobility device 1, a transmission date and time of the state information (time when the mobility device 1 is traveling), a type of the mobility device 1, a location of the mobility device 1 received by the GPS receiving unit 13, and a traveling speed, an angular velocity in three directions (roll direction, pitch direction, and yaw direction), and an acceleration in three directions (front-back direction, left-right direction, and vertical direction) of the mobility device 1 detected by the sensor 16. The type of the mobility device 1 indicates any of a large automobile, a normal automobile, a small automobile, a motorcycle (motorized bicycle), and a light vehicle.

The communication unit 14 transmits various types of information to the server device 3 and receives various types of information from the server device 3. The communication unit 14 transmits state information to the server device 3.

The drive unit 15 is, for example, a traveling motor and a transmission, and moves the mobility device 1 under control of the driving control unit 121.

Figure 3:
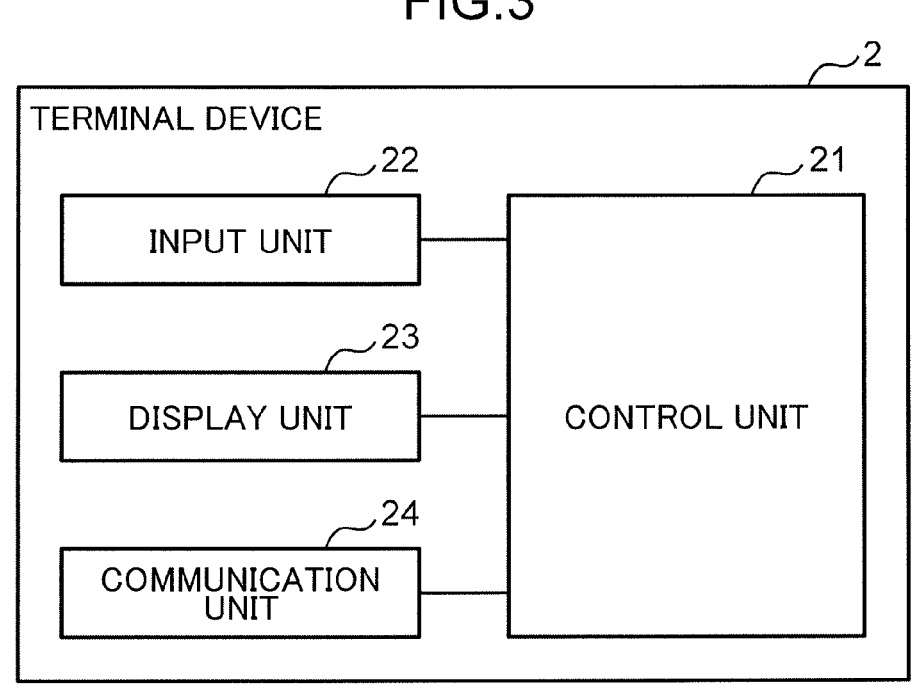
FIG. 3 is a diagram illustrating an example of a configuration of a terminal device.

FIG. 3 is a diagram illustrating an example of a configuration of the terminal device 2. As illustrated in FIG. 3, the terminal device 2 includes a control unit 21, an input unit 22, a display unit 23, and a communication unit 24.

The control unit 21 is, for example, a CPU, and controls the entire terminal device 2. The input unit 22 is, for example, a touch panel, and receives various types of information input by the user. The communication unit 24 transmits various types of information to the server device 3 and receives various types of information from the server device 3. The display unit 23 is, for example, a liquid crystal display device, and displays various types of information.

Figure 4:
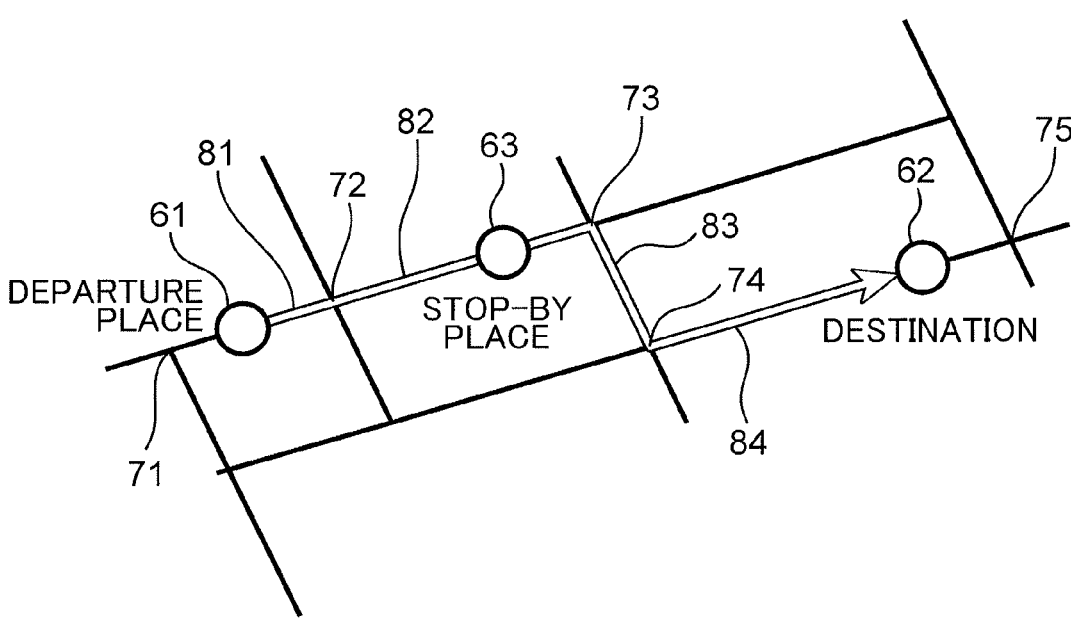
FIG. 4 is a schematic diagram for explaining a movement path of a mobility device.

Next, a movement path of the mobility device 1 will be described. FIG. 4 is a schematic diagram for explaining a movement path of the mobility device 1.

As illustrated in FIG. 4, it is assumed that the mobility device 1 moves from a departure place 61 to a destination 62. Further, it is assumed that the mobility device 1 stops at a stop-by place 63 between the departure place 61 and the destination 62 for predetermined time or more. An intersection is also referred to as a node, and a road between two nodes is also referred to as a link. In FIG. 4, a link 81 is between a node 71 and a node 72, a link 82 is between the node 72 and a node 73, a link 83 is between the node 73 and a node 74, and a link 84 is between the node 74 and a node 75. The departure place 61 is on the link 81, the destination 62 is on the link 84, and the stop-by place 63 is on the link 82. A link ID for identifying a link is assigned to each link. That is, the mobility device 1 travels on the links 81, 82, 83, and 84 while moving from the departure place 61 to the destination 62.

Figure 5:
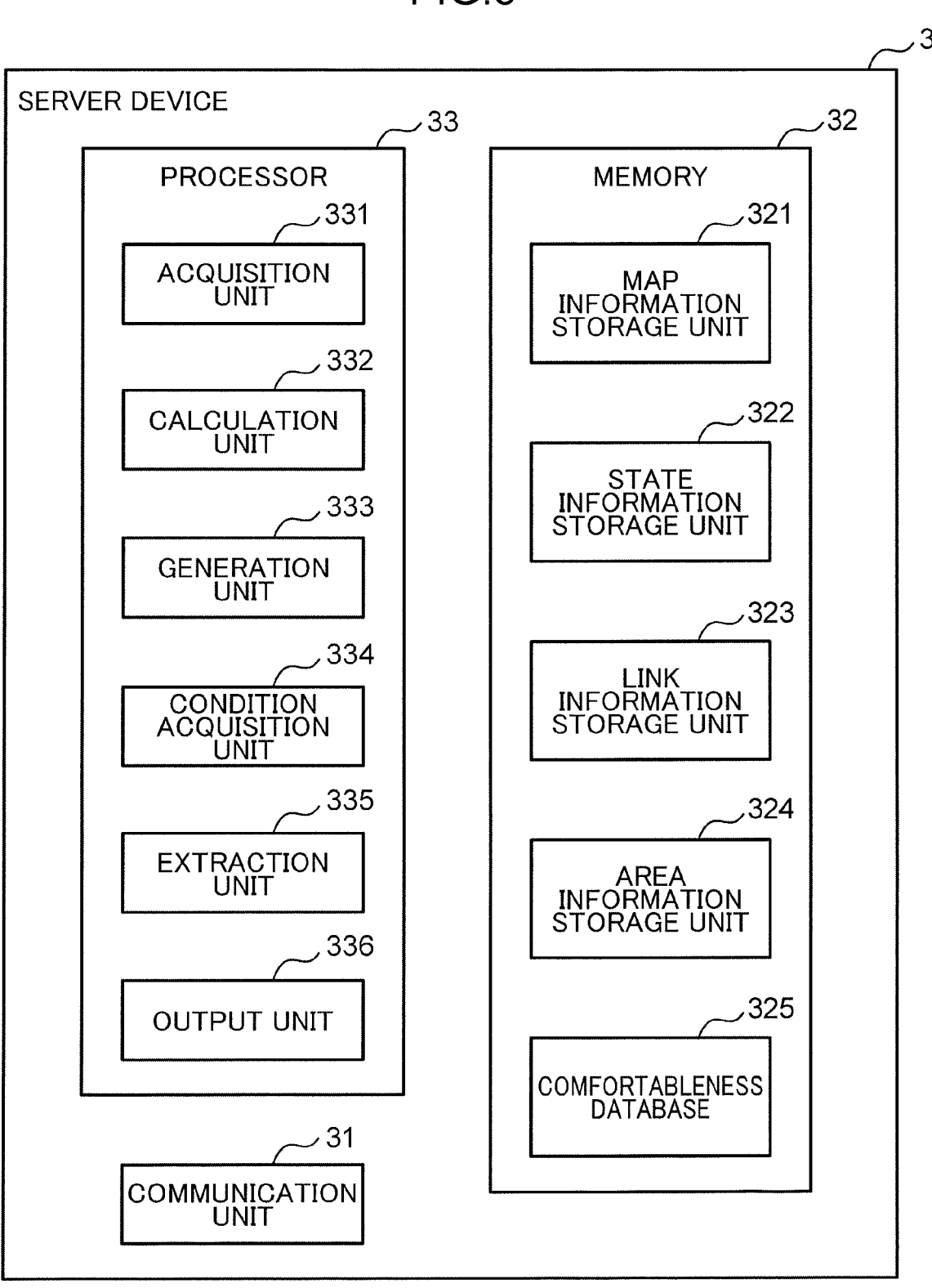
FIG. 5 is a diagram illustrating an example of a configuration of a server device.

FIG. 5 is a diagram illustrating an example of a configuration of the server device 3. As illustrated in FIG. 5, the server device 3 includes a communication unit 31, a memory 32, and a processor 33 (computer).

The communication unit 31 receives state information transmitted by the mobility device 1. The communication unit 31 outputs received state information to an acquisition unit 331.

Further, the communication unit 31 receives an extraction condition transmitted by the terminal device 2. The communication unit 31 transmits analysis result information to the terminal device 2.

The memory 32 is, for example, a semiconductor memory or a hard disk drive, and includes a map information storage unit 321, a state information storage unit 322, a link information storage unit 323, an area information storage unit 324, and a comfortableness database 325 (database).

Figures 6, 7:
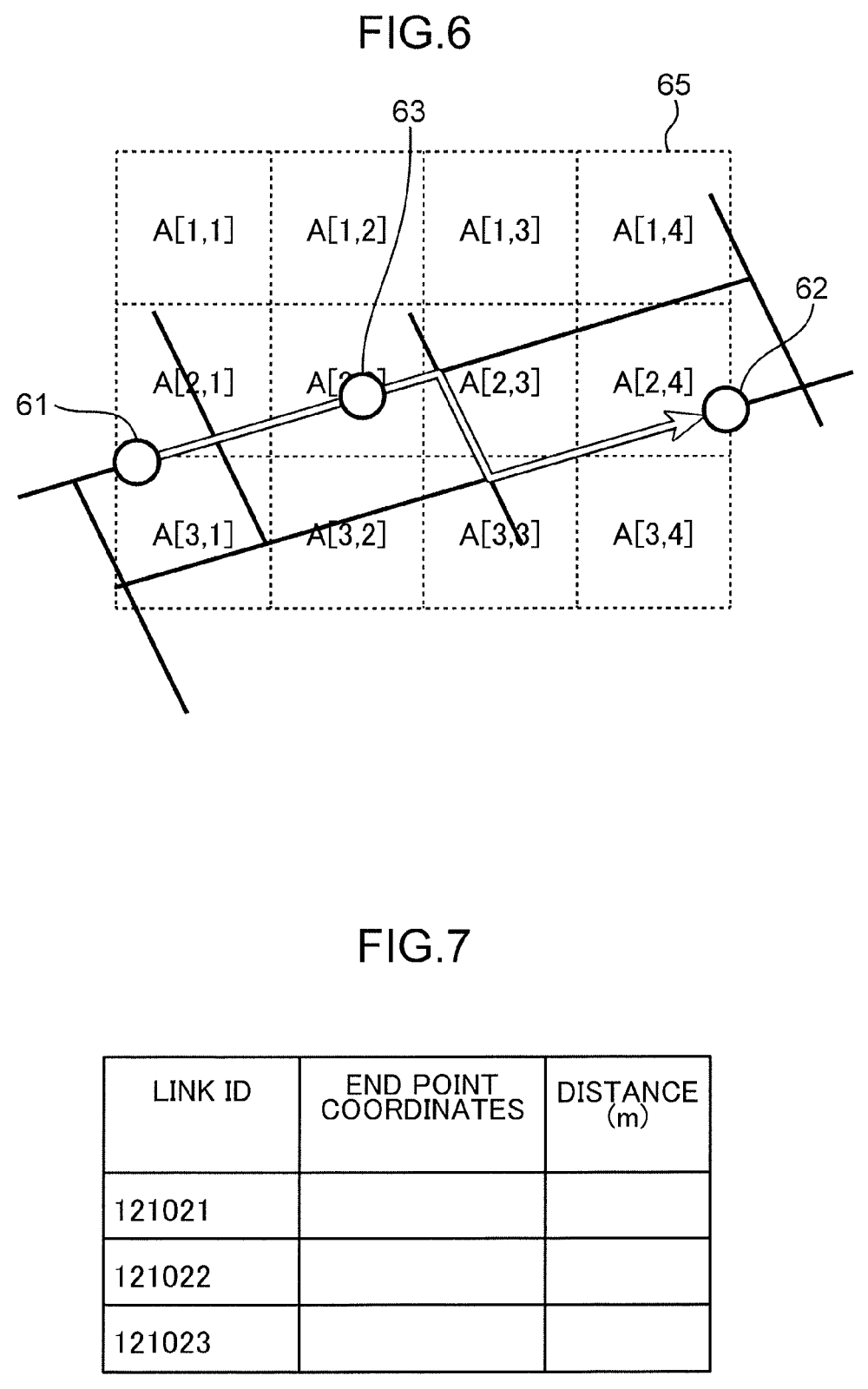

The map information storage unit 321 stores in advance information (hereinafter, map information) indicating a map of a predetermined region. A region indicated by the map information is divided into a plurality of areas. FIG. 6 is a diagram illustrating an example in which a region 65 indicated by the map information is divided into a plurality of areas.

As illustrated in FIG. 6, the region 65 indicated by the map information is divided into a plurality of rectangular areas. Each of the plurality of areas is the same size. A length of each area in a longitudinal direction and a lateral direction is, for example, 30 meters. An area ID for identifying an area is assigned to each area. In FIG. 6, "A [1,1]", "A [1,2]", and the like are area IDs. For example, the stop-by place 63 exists in an area whose area ID is "A [2,2]".

Note that, in the present embodiment, the region 65 indicated by the map information is divided into a plurality of rectangular areas, but the present disclosure is not particularly limited to this, and may be divided into a plurality of circular areas.

The state information storage unit 322 stores state information transmitted by the plurality of mobility devices 1.

The link information storage unit 323 stores link information indicating a location of each link on a map. FIG. 7 is a diagram illustrating an example of the link information. As illustrated in FIG. 7, the link information storage unit 323 stores link information in which a link ID, end point coordinates, and a distance are associated with each other. The end point coordinates represent coordinates on a map of two nodes that are two end points of a link. The distance represents a distance between two end points of a link.

The area information storage unit 324 stores area information indicating a location on a map of each area included in the region 65 indicated by map information. FIG. 8 is a diagram illustrating an example of area information. As illustrated in FIG. 8, the area information storage unit 324 stores area information in which an area ID and center coordinates of an area are associated with each other. The center coordinates represent center coordinates on a map of each of a plurality of divided areas.

The comfortableness database 325 is a database that stores, for each of one or more links in a predetermined area, a type of the mobility device 1 and travel comfortableness when traveling on each link in the type of the mobility device 1 in association with each other.

The travel comfortableness indicates how high comfortableness at the time of traveling on each link in a predetermined area in the mobility device 1 is among one or more links in a predetermined area. For this reason, by referring to the comfortableness database 325, for example, it is possible to grasp traveling in which type of the mobility device 1 and on which link enables most comfortable movement in a predetermined area.

FIG. 9 is a diagram illustrating an example of the comfortableness database 325. For example, FIG. 9 illustrates an example in which a type "large automobile" of the mobility device 1 and travel comfortableness "R11" when traveling on a link with a link ID of "131011" in the mobility device 1 of the type "large automobile" are associated with the link with the link ID of "131011" in the comfortableness database 325.

The comfortableness database 325 is generated by a generation unit 333. A method of generating the comfortableness database 325 will be described later.

The processor 33 is, for example, a CPU, and includes the acquisition unit 331, a calculation unit 332, the generation unit 333, a condition acquisition unit 334, an extraction unit 335, and an output unit 336.

The acquisition unit 331 acquires state information indicating a current state of the mobility device 1 being driven, and stores the acquired state information in the state information storage unit 322.

The calculation unit 332 refers to the state information storage unit 322, the link information storage unit 323, and the area information storage unit 324, and calculates, for each type of the plurality of mobility devices 1, for each of one or more links (roads) in a predetermined area (predetermined area), travel comfortableness indicating how high comfortableness when traveling on each link with each type of the mobility device 1 is among the one or more links. Details of a method of calculating the travel comfortableness will be described later.

The generation unit 333 generates, for each of one or more links in a predetermined area, a comfortableness database 325 in which a type of the plurality of mobility devices 1 is associated with travel comfortableness at the time of traveling on each link in the type of the mobility device 1 calculated by the calculation unit 332.

The condition acquisition unit 334 acquires an extraction condition received by the communication unit 31. The extraction condition includes a departure place and a destination of the mobility device 1, a type of the mobility device 1, at least one of a departure time and an arrival time of the mobility device 1, and a condition for identifying travel comfortableness when traveling on a road in the mobility device 1 of the type.

The extraction unit 335 extracts at least one link satisfying an extraction condition acquired by the condition acquisition unit 334 from the link information storage unit 323, the area information storage unit 324, and the comfortableness database 325.

Specifically, the extraction unit 335 refers to the link information storage unit 323, the area information storage unit 324, and the comfortableness database 325, and uses a best priority search algorithm to search for at least one best route for moving between a departure place and a destination identified by an extraction condition acquired by the condition acquisition unit 334. The best priority search algorithm is, for example, Dijkstra's algorithm, A* algorithm, or uniform-cost search.

The extraction unit 335 extracts all links constituting at least one searched best route as at least one link satisfying an extraction condition.

The output unit 336 outputs analysis result information including at least one link extracted by the extraction unit 335 to the communication unit 31. The communication unit 31 transmits the analysis result information to the terminal device 2.

Specifically, the output unit 336 appropriately refers to the link information storage unit 323, the area information storage unit 324, and the map information storage unit 321 to acquire map information including at least one link extracted by the extraction unit 335. The output unit 336 performs drawing so as to emphasize a departure place and a destination identified by at least one best route searched by the extraction unit 335 and an extraction condition on a map indicated by the map information. The output unit 336 outputs information indicating the drawn map to the communication unit 31 as analysis result information. Drawing so as to emphasize includes drawing a drawing target in a dark color, drawing a drawing target with a thick line, surrounding a drawing target with a line drawing, and the like.

Figure 10A:
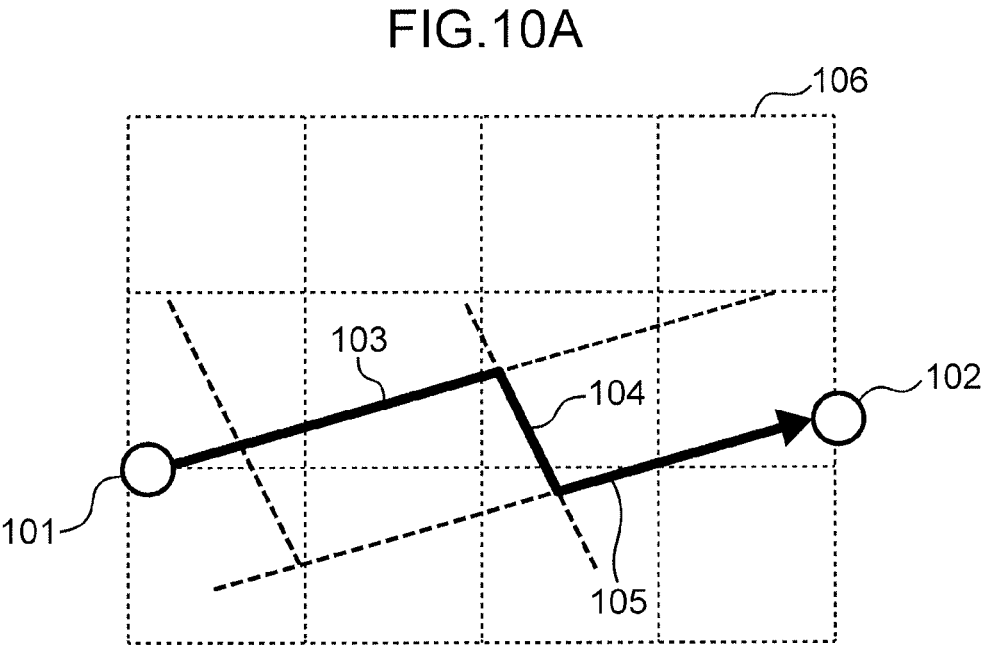
FIG. 10A is a diagram illustrating an example of analysis result information.

FIG. 10A is a diagram illustrating an example of analysis result information. For example, FIG. 10A illustrates an example in which, on a map 106 indicated by map information including all three links 103 to 105 extracted by the extraction unit 335, the output unit 336 draws a link different from the three links 103 to 105 with a broken line and draws the three links 103 to 105 with emphasis by a black thick line arrow, so as to draw by emphasizing a route searched for by the extraction unit 335 including the three links 103 to 105. Further, FIG. 10A illustrates an example in which the output unit 336 draws a departure place 101 and a destination 102 identified by an extraction condition with emphasis by a black circle.

Note that the output unit 336 may generate a heat map indicating a relationship between each of at least one link extracted by the extraction unit 335 and travel comfortableness when traveling on each of the at least one link in a type of the mobility device 1 identified by an extraction condition, and output analysis result information including the generated heat map to the communication unit 31.

Specifically, the output unit 336 may refer to the comfortableness database 325, and, on a map indicated by map information including all of at least one link extracted by the extraction unit 335, draw each of the at least one link so as to emphasize each of the at least one link more as a value of travel comfortableness associated with each link and a type of the mobility device 1 specified by an extraction condition is larger.

Figure 10B:
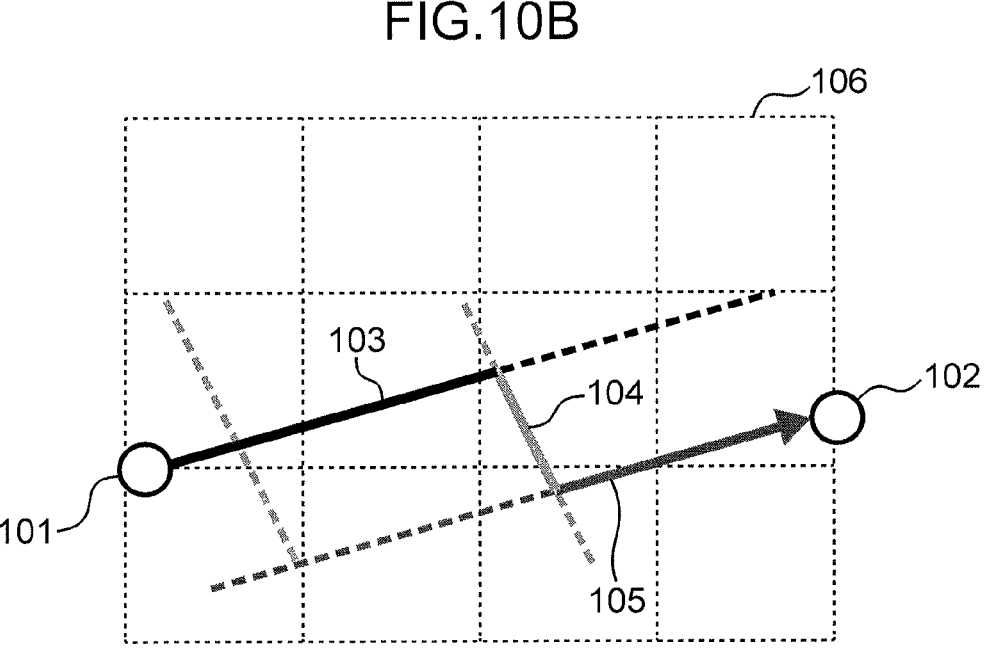
FIG. 10B is a diagram illustrating another example of the analysis result information.

FIG. 10B is a diagram illustrating another example of analysis result information. For example, FIG. 10B illustrates an example in which the output unit 336 emphasizes each of three of the links 103 to 105 constituting a route searched for by the extraction unit 335 and another link extracted by the extraction unit 335 on the map 106 illustrated in FIG. 10A by drawing them in a darker color as a value of travel comfortableness associated with each link and a type of the mobility device 1 identified by an extraction condition is larger. In the example of FIG. 10B, among the three links 103 to 105, the link 103 is drawn in a darkest color, and the link 104 is drawn in a lightest color. This indicates that travel comfortableness of the link 103 is highest and travel comfortableness of the link 104 is lowest among the three links 103 to 105.

(Database Generation Operation)

Figure 11:
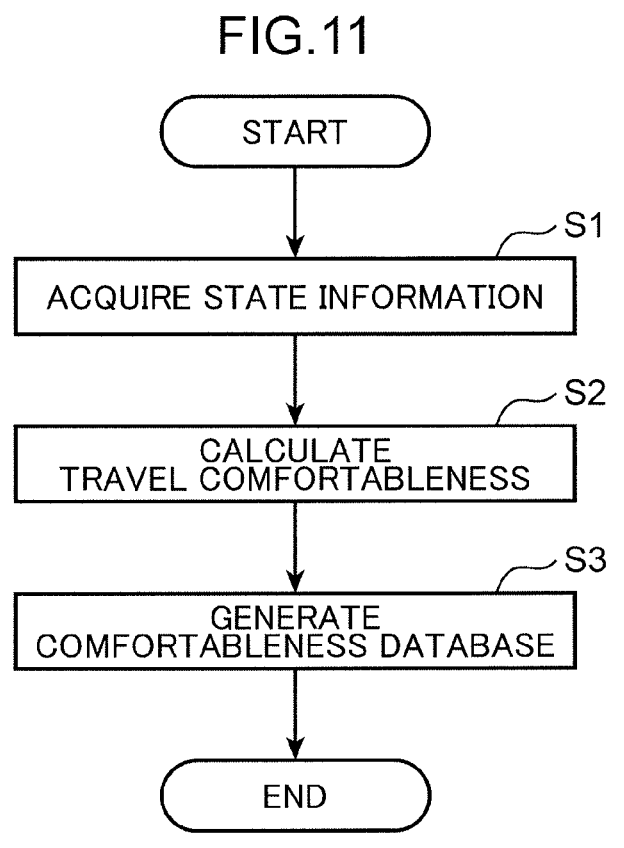

Next, database generation operation of the server device 3 will be described. FIG. 11 is a flowchart for explaining database generation operation of the server device 3.

Hereinafter, operation of generating the comfortableness database 325 for a certain area (hereinafter, target area) in the server device 3 will be described. Note that operation of generating the comfortableness database 325 is executed for an optional area at an optional timing such as once a day.

As illustrated in FIG. 11, first, in step S1, the acquisition unit 331 acquires state information periodically transmitted from the plurality of traveling mobility device 1, and stores the acquired state information in the state information storage unit 322.

Next, in step S2, for each of one or more links in a target area, the calculation unit 332 calculates travel comfortableness for each type of the plurality of mobility device 1 based on the state information acquired from the plurality of mobility device 1 traveling on the one or more links. A method of calculating travel comfortableness in step S2 will be described later.

Next, in step S3, the generation unit 333 generates, for each of one or more links in a target area, the comfortableness database 325 in which a type of the mobility device 1 is associated with the travel comfortableness at the time of traveling on each link in the type of the mobility device 1 calculated by the calculation unit 332.

Calculation of Travel Comfortableness

Next, a method of calculating travel comfortableness by the calculation unit 332 in step S2 will be described. Hereinafter, an example in which for the mobility device 1 of a certain one type (hereinafter, target type), travel comfortableness when the mobility device 1 of the target type travels on each link is calculated for each of one or more links in a target area will be described.

Calculation of Speed Comfortableness

First, the calculation unit 332 calculates speed comfortableness based on an average speed when the mobility device 1 of a target type travels on each link and sample standard deviation of a speed when the mobility device 1 of the target type travels on each link. The speed comfortableness indicates how much the mobility device 1 of a target type can travel on each link at a comfortable speed.

Specifically, the calculation unit 332 refers to the link information storage unit 323, the area information storage unit 324, and the state information storage unit 322, and acquires state information transmitted when the mobility device 1 of a target type is traveling on one or more links in a target area.

The calculation unit 332 refers to a traveling speed of the mobility device 1 included in acquired state information, and calculates, for each of one or more links in a target area, an average value $V_{q\_ave}$ of traveling speeds when the mobility device 1 of a target type travels on each of links $L_q$. Hereinafter, the average value $V_{q\_ave}$ of traveling speeds when the mobility device 1 of the target type travels on each of the links $L_q$ is abbreviated as the average speed $V_{q\_ave}$ in each of the links $L_q$.

Note that, instead of referring to a traveling speed of the mobility device 1 included in acquired state information, the calculation unit 332 may refer to a location of the mobility device 1 included in acquired state information and calculate a traveling speed of the mobility device 1 of a target type.

Further, the calculation unit 332 may exclude state information indicating that a traveling speed of the mobility device 1 of a target type is equal to or less than a predetermined lower limit speed from acquired state information. In this case, information acquired when the mobility device 1 of a target type is forcibly caused to travel at a low speed equal to or less than the lower limit speed or stop due to traffic congestion, signal waiting, or the like can be excluded from state information, and speed comfortableness of when the mobility device 1 of a target type normally travels can be appropriately calculated based on the state information.

Next, the calculation unit 332 calculates comfortableness $C_q$ of a speed at the time of traveling on each of the links $L_q$ in the mobility device 1 of a target type by using Equation (1) below including the average speed $V_{q\_ave}$ in each of the links $L_q$.

[Mathematical formula 1]

$$C_q = \frac{V_{q\_ave} - V_{ave\_min}}{V_{ave\_max} - V_{ave\_min}} \times 100\% \tag{1}$$

In Equation (1), $V_{ave\_min}$ represents a minimum value of the average speeds $V_{q\_ave}$ of one or more of the links $L_q$ in a target area. $V_{ave\_max}$ indicates a maximum value among the average speeds $V_{q\_ave}$ of one or more of the links $L_q$ in a target area. That is, according to Equation (1), as the average speed $V_{q\_ave}$ in the link $L_q$ increases, the comfortableness $C_q$ of a speed at the time of traveling on the link $L_q$ in the mobility device 1 of a target type increases. For this reason, the comfortableness $C_q$ of a speed at the time of traveling on the link $L_q$ with the average speed $V_{q\_ave}$ being at the maximum value $V_{ave\_max}$ among one or more links in the target area is 100%.

Next, the calculation unit 332 refers to a traveling speed included in the acquired state information, and calculates, for each of one or more links in a target area, sample standard deviation $V_{q\_ssd}$ of a traveling speed when the mobility device 1 of a target type travels on each of the links $L_q$. Hereinafter, the sample standard deviation $V_{q\_ssd}$ of a traveling speed when the mobility device 1 of a target type travels on each of the links $L_q$ is abbreviated as the sample standard deviation $V_{q\_ssd}$ of a traveling speed in each of the links $L_q$.

Next, the calculation unit 332 calculates stability $D_q$ of a speed at the time of traveling on each of the links $L_q$ in the mobility device 1 of a target type by using Equation (2) below including the sample standard deviation $V_{q\_ssd}$ of a traveling speed in each of the links $L_q$.

[Mathematical formula 2]

$$D_q = \frac{1 - (V_{q\_ssd} - V_{ssd\_min})}{V_{ssd\_max} - V_{ssd\_min}} \times 100\% \tag{2}$$

In Equation (2), $V_{ssd\_min}$ represents a minimum value of the sample standard deviation $V_{q\_ssd}$ of a traveling speed of one or more of the links $L_q$ in a target area. $V_{ssd\_max}$ indicates a maximum value of the sample standard deviation $V_{q\_ssd}$ of a traveling speed of one or more of the links $L_q$ in the target area. That is, according to Equation (2), as the sample standard deviation $V_{q\_ssd}$ of a traveling speed in the link $L_q$ is smaller, the stability $D_q$ of a speed at the time of traveling on the link $L_q$ in the mobility device 1 of a target type becomes larger. For this reason, the stability $D_q$ of a speed at the time of traveling on the link $L_q$ in which the sample standard deviation $V_{q\_ssd}$ of a traveling speed is the minimum value $V_{ssd\_min}$ among one or more links in a target area is 100%.

Then, as shown in Equation (3) below, the calculation unit 332 calculates a weighted average value of the comfortableness $C_q$ of a speed and the stability $D_q$ of a speed when traveling on each of the links $L_q$ in the mobility device 1 of a target type as speed comfortableness $M_q$ when traveling on each of the links $L_q$ in the mobility device 1 of a target type.

[Mathematical formula 3]

$$M_q = \frac{(W_C \times C_q + W_D \times D_q)}{(W_C + W_D)} e \tag{3}$$

In Equation (3), $W_C$ is a weighting factor of the comfortableness $C_q$ of a speed, and $W_D$ is a weighting factor of the stability $D_q$ of a speed. The weighting factor $W_C$ and the weighting factor $W_D$ are set to an optional value of zero or more in such a manner that at least one of the weighting factor $W_C$ and the weighting factor $W_D$ has a value larger than zero.

The weighting factor $W_C$ and the weighting factor $W_D$ may be appropriately determined according to which one of the comfortableness $C_q$ of a speed and the stability $D_q$ of a speed is emphasized as comfortableness at the time of traveling of the mobility device 1 by the user of the mobility device 1 based on an experimental value. For example, in a case where only the comfortableness $C_q$ of a speed is regarded as comfortableness at the time of traveling of the mobility device 1, the weighting factor $W_C$ is preferably set to a value larger than zero, and the weighting factor $W_D$ is preferably set to zero.

Calculation of Straight Travel Comfortableness

Next, the calculation unit 332 calculates straight travel comfortableness based on an average angular velocity and an average acceleration when the mobility device 1 of a target type travels on each link and sample standard deviation of an angular velocity and an acceleration when the mobility device 1 of a target type is traveling on each link.

The straight travel comfortableness indicates how comfortable it is to travel straight on each link in the mobility device 1 of a target type.

Specifically, the calculation unit 332 refers to angular velocities in three directions of the mobility device 1 included in the acquired state information, and calculates, for each of one or more links in a target area, an average value $\Omega_{jq\_ave}$ of angular velocities in each direction j when the mobility device 1 of a target type travels on each of the links $L_q$. Hereinafter, the average value $\Omega_{jq\_ave}$ of angular velocities in each of the directions j when the mobility device 1 of a target type travels on each of the links $L_q$ is abbreviated as the average angular velocity $\Omega_{jq\_ave}$ in each of the directions j in each of the links $L_q$.

Note that, instead of referring to angular velocities in three directions of the mobility device 1 included in acquired state information, the calculation unit 332 may refer to a location of the mobility device 1 included in acquired state information and calculate angular velocities in three directions of the mobility device 1 of a target type.

Further, the calculation unit 332 may exclude state information indicating that a traveling speed of the mobility device 1 of a target type is equal to or less than a predetermined lower limit speed from acquired state information. In this case, information acquired when the mobility device 1 of a target type is forcibly caused to travel at a low speed equal to or less than the lower limit speed or stop due to traffic congestion, signal waiting, or the like can be excluded from state information, and straight travel comfortableness of when the mobility device 1 of a target type normally travels can be appropriately calculated based on the state information.

Next, the calculation unit 332 calculates comfortableness $E_{jq}$ of a degree of rotation in each of the directions j at the time of traveling on each of the links $L_q$ in the mobility device 1 of a target type by using Equation (4) below including the average angular velocity $\Omega_{jq\_ave}$ in each of the directions j in each of the links $L_q$.

[Mathematical formula 4]

$$E_{jq} = \frac{1 - (\Omega_{jq\_ave} - \Omega_{j\_ave\_min})}{\Omega_{j\_ave\_max} - \Omega_{j\_ave\_min}} \times 100\% \qquad (4)$$

In Equation (4), $\Omega_{q\_ave\_min}$ represents a minimum value of the average angular velocity $\Omega_{jq\_ave}$ in each of the directions j in one or more of the links $L_q$ in a target area. $\Omega_{q\_ave\_max}$ represents a maximum value of the average angular velocity $\Omega_{jq\_ave}$ in each of the directions j in one or more of the links $L_q$ in a target area. That is, according to Equation (4), as the average angular velocity $\Omega_{jq\_ave}$ in each of the directions j in the link $L_q$ is smaller, the comfortableness $E_{jq}$ of a degree of rotation in each of the directions j when traveling on the link $L_q$ in the mobility device 1 of a target type becomes higher. For this reason, the comfortableness $E_{jq}$ of a degree of rotation in each of the directions j when traveling on the link $L_q$ in which the average angular velocity $\Omega_{jq\_ave}$ in each of the directions j is the minimum value $\Omega_{q\_ave\_min}$ among one or more links in a target area is 100%.

Next, the calculation unit 332 refers to an angular velocity included in the acquired state information, and calculates, for each of one or more links in a target area, sample standard deviation $\Omega_{jq\_ssd}$ of an angular velocity in each of the directions j when the mobility device 1 of a target type travels on each of the links $L_q$. Hereinafter, the sample standard deviation $\Omega_{jq\_ssd}$ of an angular velocity in each of the directions j when the mobility device 1 of a target type travels on each of the links $L_q$ is abbreviated as the sample standard deviation $\Omega_{jq\_ssd}$ of an angular velocity in each of the directions j in each of the links $L_q$.

Next, the calculation unit 332 calculates stability $F_{jq}$ of a degree of rotation in each of the directions j at the time of traveling on each of the links $L_q$ in the mobility device 1 of a target type by using Equation (5) below including the sample standard deviation $\Omega_{jq\_ssd}$ of an angular velocity in each of the directions j in each of the links $L_q$.

[Mathematical formula 5]

$$F_{jq} = \frac{1 - (\Omega_{jq\_ssd} - \Omega_{j\_ssd\_min})}{\Omega_{j\_ssd\_max} - \Omega_{j\_ssd\_min}} \times 100\% \qquad (5)$$

In Equation (5), $\Omega_{j\_ssd\_min}$ represents a minimum value of the sample standard deviation $\Omega_{jq\_ssd}$ of an angular velocity in each of the directions j in one or more links $L_q$ in a target area. $\Omega_{j\_ssd\_max}$ represents a maximum value of the sample standard deviation $\Omega_{jq\_ssd}$ of an angular velocity in each of the directions j in one or more of the links $L_q$ in a target area. That is, according to Equation (2), as the sample standard deviation $\Omega_{jq\_ssd}$ of an angular velocity in each of the directions j in the link $L_q$ is lower, the stability $F_{jq}$ of a degree of rotation in each of the directions j at the time of traveling on the link $L_q$ in the mobility device 1 of a target type becomes higher. For this reason, among one or more links in a target area, the stability $F_{jq}$ of a degree of rotation in each of the directions j when traveling on the link $L_q$ in which the sample standard deviation $\Omega_{jq\_ssd}$ of an angular velocity in each of the directions j is the minimum value $\Omega_{j\_ssd\_min}$ is 100%.

Next, the calculation unit 332 refers to accelerations in three directions of the mobility device 1 included in the acquired state information, and calculates, for each of one or more links in a target area, an average value $A_{jq\_ave}$ of accelerations in each of the directions j when the mobility device 1 of a target type travels on each of the links $L_q$. Hereinafter, the average value $A_{jq\_ave}$ of accelerations in each of the directions j when the mobility device 1 of a target type travels on each of the links $L_q$ is abbreviated as the average acceleration $A_{jq\_ave}$ in each of the directions j in each of the links $L_q$.

Further, the calculation unit 332 may exclude state information indicating that a traveling speed of the mobility device 1 of a target type is equal to or less than a predetermined lower limit speed from acquired state information. In this case, information acquired when the mobility device 1 of a target type is forcibly caused to travel at a low speed equal to or less than the lower limit speed or stop due to traffic congestion, signal waiting, or the like can be excluded from state information, and straight travel comfortableness when the mobility device 1 of a target type normally travels can be appropriately calculated based on the state information.

Next, the calculation unit 332 calculates comfortableness $G_{jq}$ of a degree of acceleration in each of the directions j when traveling on each of the links $L_q$ in the mobility device 1 of a target type by using Equation (6) below including the average acceleration $A_{jq\_ave}$ in each of the directions j in each of the links $L_q$.

[Mathematical formula 6]

$$G_{jq} = \frac{1 - (A_{jq\_ave} - A_{j\_ave\_min})}{A_{j\_ave\_max} - A_{j\_ave\_min}} \times 100\% \qquad (6)$$

In Equation (6), $A_{j\_ave\_min}$ represents a minimum value of the average acceleration $A_{jq\_ave}$ in each of the directions j in one or more of the links $L_q$ in a target area. $A_{j\_ave\_max}$ indicates a maximum value of the average acceleration $A_{jq\_ave}$ in each of the directions j in one or more of the links $L_q$ in a target area. That is, according to Equation (6), as the average acceleration $A_{jq\_ave}$ in each of the directions j in the link $L_q$ is smaller, the comfortableness $G_{jq}$ of a degree of acceleration in each of the directions j at the time of traveling on the link $L_q$ in the mobility device 1 of a target type becomes higher. For this reason, the comfortableness $G_{jq}$ of a degree of acceleration in each of the directions j when traveling on the link $L_q$ in which the average acceleration $A_{jq\_ave}$ in each of the directions j is the minimum value $A_{j\_ave\_min}$ among one or more links in a target area is 100%.

Next, the calculation unit 332 refers to an acceleration included in the acquired state information, and calculates, for each of one or more links in a target area, sample standard deviation $A_{jq\_ssd}$ of an acceleration in each of the directions j when the mobility device 1 of a target type travels on each of the links $L_q$. Hereinafter, the sample standard deviation $A_{jq\_ssd}$ of an acceleration in each of the directions j when the mobility device 1 of a target type travels on each of the links $L_q$ is abbreviated as the sample standard deviation $A_{jq\_ssd}$ of an acceleration in each of the directions j in each of the links $L_q$.

Next, the calculation unit 332 calculates stability $H_{jq}$ of a degree of acceleration in each of the directions j when traveling on each of the links $L_q$ in the mobility device 1 of a target type by using Equation (7) below including the sample standard deviation $A_{jq\_ssd}$ of an acceleration in each of the directions j in each of the links $L_q$.

[Mathematical formula 7]

$$H_{jq} = \frac{1 - (A_{jq\_ssd} - A_{j\_ssd\_min})}{A_{j\_ssd\_max} - A_{j\_ssd\_min}} \times 100\% \qquad (7)$$

In Equation (7), $A_{j\_ssd\_min}$ represents a minimum value of the sample standard deviation $A_{jq\_ssd}$ of an acceleration in each of the directions j in one or more of the links $L_q$ in a target area. $A_{j\_ssd\_max}$ represents a maximum value of the sample standard deviation $A_{jq\_ssd}$ of an acceleration in each of the directions j in one or more of the links $L_q$ in a target area. That is, according to Equation (7), as the sample standard deviation $A_{jq\_ssd}$ of an acceleration in each of the directions j in the link $L_q$ is lower, the stability $H_{jq}$ of a degree of acceleration in each of the directions j at the time of traveling on the link $L_q$ in the mobility device 1 of a target type becomes higher. For this reason, among one or more links in a target area, the stability $H_{jq}$ of a degree of acceleration in each of the directions j when traveling on the link $L_q$ in which the sample standard deviation $A_{jq\_ssd}$ of an acceleration in each of the directions j is the minimum value $A_{j\_ssd\_min}$ is 100%.

Then, as shown in Equation (8) below, the calculation unit 332 calculates a weighted average value of the comfortableness $E_{jq}$ of a degree of rotation in each of the directions j, the stability $F_{jq}$ of a degree of rotation in each of the directions j, the comfortableness $G_{jq}$ of a degree of acceleration in each of the directions j, and the stability $H_{jq}$ of a degree of acceleration in each of the directions j when traveling on each of the links $L_q$ in the mobility device 1 of a target type as straight travel comfortableness $N_q$ when traveling on each of the links $L_q$ in the mobility device 1 of a target type.

[Mathematical formula 8]

$$N_q = \frac{\sum_{j=1}^{3} ((W_{jE} \times E_{jq}) + (W_{jF} \times F_{jq}) + (W_{jG} \times G_{jq}) + (W_{jH} \times H_{jq}))}{\sum_{j=1}^{3} (W_{jE} + W_{jF} + W_{jG} + W_{jH})} \qquad (8)$$

In Equation (8), $W_{jE}$ is a weighting factor of the comfortableness $E_{jq}$ of a degree of rotation in each of the directions j. $W_{jF}$ is a weighting factor of the stability $F_{jq}$ of a degree of rotation in each of the directions j. $W_{jG}$ is a weighting factor of the comfortableness $G_{jq}$ of a degree of acceleration in each of the directions j. $W_{jH}$ is a weighting factor of the stability $H_{jq}$ of a degree of acceleration in each of the directions j. The weighting factors $W_{jE}$, $W_{jF}$, $W_{jG}$, and $W_{jH}$ are set to an optional value of zero or more such that at least one of the weighting factors $W_{jE}$, $W_{jF}$, $W_{jG}$, and $W_{jH}$ has a value larger than zero.

The weighting factors $W_{jE}$, $W_{jF}$, $W_{jG}$, and $W_{jH}$ (j=1 to 3) may be appropriately determined according to which of the comfortableness $E_{jq}$ of a degree of rotation in each of the directions j, the stability $F_{jq}$ of a degree of rotation in each of the directions j, the comfortableness $G_{jq}$ of a degree of acceleration in each of the directions j, and the stability $H_{jq}$ of a degree of acceleration in each of the directions j by the user of the mobility device 1 emphasizes as comfortableness at the time of traveling of the mobility device 1 based on an experimental value.

For example, in a case where comfortableness $E_{1q}$, $E_{2q}$, and $E_{3q}$ of a degree of rotation in three directions and comfortableness $G_{1q}$, $G_{2q}$, and $G_{3q}$ of a degree of acceleration in three directions are emphasized as comfortableness at the time of traveling of the mobility device 1, weighting factors $W_{1E}$, $W_{2E}$, $W_{3E}$, $W_{1G}$, $W_{2G}$, and $W_{3G}$ are preferably set to a value larger than zero, and weighting factors $W_{1F}$, $W_{2F}$, $W_{3F}$, $W_{1H}$, $W_{2H}$, and $W_{3H}$ are preferably set to zero.

Then, as shown in Equation (9) below, the calculation unit 332 calculates a weighted average value of the speed comfortableness $M_q$ and the straight travel comfortableness $N_q$ as travel comfortableness $R_q$ when the mobility device 1 of a target type travels on each of the links $L_q$.

[Mathematical formula 9]

$$R_q = \frac{(\alpha \times M_q + \beta \times N_q)}{(\alpha + \beta)} \qquad (9)$$

In Equation (9), $\alpha$ represents a weighting factor of the speed comfortableness $M_q$ larger than zero. $\beta$ represents a weighting factor of the straight travel comfortableness $N_q$ larger than zero. The weighting factors $\alpha$ and $\beta$ may be appropriately determined based on an experimental value according to which one of the speed comfortableness $M_q$ and the straight travel comfortableness $N_q$ the user of the mobility device 1 emphasizes as comfortableness at the time of traveling of the mobility device 1. For example, in a case where the speed comfortableness $M_q$ is emphasized more than the straight travel comfortableness $N_q$ as comfortableness at the time of traveling of the mobility device 1, the weighting factor $\alpha$ may be set to a value larger than the weighting factor $\beta$.

According to the configuration of the above embodiment, for each of one or more links in a target area, the comfortableness database 325 in which a type of the plurality of mobility devices 1 and the travel comfortableness $R_q$ at the time of traveling on each of the links $L_q$ in the mobility device 1 of the type are associated with each other is generated. For this reason, from the generated comfortableness database 325, it is possible to collect the travel comfortableness $R_q$ at the time of traveling on each of the links $L_q$ in a predetermined area within the mobility device 1 of a specific type.

Further, from the collected travel comfortableness $R_q$, it is possible to grasp relatively how high comfortableness each of the links $L_q$ can be traveled with among one or more links in a predetermined area by the mobility device 1 of the specific type. By the above, in a case of moving in a predetermined area, it is possible to grasp which type of mobility device should be used and on which link one should travel in order to move comfortably.

Note that, in step S2 (FIG. 11), the calculation unit 332 may calculate, for each of one or more links in a target area, a type of the plurality of mobility devices 1 and travel comfortableness in a time zone in which the plurality of mobility devices 1 travel, based on state information acquired from the plurality of mobility devices 1 traveling on the one or more links. The time zone may be, for example, a time zone of one hour obtained by equally dividing a day into 24, or a time zone of 12 hours indicating the morning and a time zone of 12 hours indicating the afternoon.

In this case, the calculation unit 332 refers to the link information storage unit 323, the area information storage unit 324, and the state information storage unit 322, and acquires state information indicating that the mobility device 1 of a target type travels on one or more links in a target area. The calculation unit 332 refers to a transmission date and time included in acquired state information, and divides the acquired state information for each time zone including the referred transmission date and time. The calculation unit 332 calculates the travel comfortableness $R_q$ as described above by using the state information in each of the divided time zones, and sets the calculated travel comfortableness $R_q$ as the travel comfortableness $R_q$ at the time of traveling on each of the links $L_q$ in the mobility device 1 of a target type in each of the time zones.

In accordance with the above, in step S3 (FIG. 11), the generation unit 333 generates the comfortableness database 325 in which a type of the mobility device 1, a time zone in which the mobility device 1 travels, and the travel comfortableness $R_q$ at the time of traveling on each of the links $L_q$ in the type of the mobility device 1 in the time zone calculated by the calculation unit 332 are associated with each of one or more links in a target area.

FIG. 12 is a diagram illustrating another example of the comfortableness database 325. For example, FIG. 12 illustrates an example in which a type "large automobile" of the mobility device 1, a time zone "morning" in which the mobility device 1 of the type "large automobile" travels, and travel comfortableness "R111" when traveling on a link with a link ID of "131011" in the mobility device 1 of the type "large automobile" in the time zone "morning" are associated with the link with the link ID of "131011" in the generated comfortableness database 325.

In this case, from the generated comfortableness database 325, it is possible to collect the travel comfortableness $R_q$ at the time of traveling on each of the links $L_q$ in a target area in the mobility device 1 of a specific type in a specific time zone. According to the collected travel comfortableness $R_q$, it is possible to grasp relatively how high comfortableness each of the links $L_q$ can be traveled with among one or more links in a target area by the mobility device 1 of a specific type in a specific time zone. By the above, in a case of moving in a target area in a certain time zone, it is possible to grasp which type of mobility device should be used and on which link one should travel in order to move comfortably.

Similarly, in step S2 (FIG. 11), the calculation unit 332 may calculate, for each of one or more links in a target area, a type of the plurality of mobility devices 1 and travel comfortableness in an environment when the plurality of mobility devices 1 travel, based on state information acquired from the plurality of mobility devices 1 traveling on the one or more links. The environment when the plurality of mobility devices 1 travel is, for example, weather, season, or a date category of when the plurality of mobility devices 1 travel. The date category indicates which one of seven days of the week from Sunday to Saturday or a national holiday the date is.

In this case, in step S1 (FIG. 11), the acquisition unit 331 refers to a transmission date and time included in state information acquired from the plurality of mobility devices 1 during traveling, and inquires of the public server 4 about information indicating weather, season, or a date category corresponding to the transmission date and time by using the communication unit 31. The acquisition unit 331 acquires information indicating weather, season, or a date category corresponding to the transmission date and time received by the communication unit 31 from the public server 4 as information indicating an environment of when the mobility device 1 travels. The acquisition unit 331 includes acquired information (hereinafter, environment information) indicating an environment of when the mobility device 1 travels in state information and stores the state information in the state information storage unit 322.

In accordance with the above, in step S2, the calculation unit 332 refers to the link information storage unit 323, the area information storage unit 324, and the state information storage unit 322, and acquires state information indicating that the mobility device 1 of a target type travels on one or more links in a target area. The calculation unit 332 refers to environment information included in the acquired state information, and divides the acquired state information for each environment indicated by the referred environment information. The calculation unit 332 calculates the travel comfortableness $R_q$ as described above by using state information of each environment after the division, and sets the calculated travel comfortableness $R_q$ as the travel comfortableness $R_q$ at the time of traveling on each of the links $L_q$ in the mobility device 1 of a target type in each environment.

In accordance with the above, in step S3 (FIG. 11), the generation unit 333 generates the comfortableness database 325 in which a type of the mobility device 1, an environment of when the mobility device 1 travels, and the travel comfortableness $R_q$ at the time of traveling on each of the links $L_q$ in the type of the mobility device 1 in the environment calculated by the calculation unit 332 are associated with each of one or more links in a target area.

FIG. 13 is a diagram illustrating another example of the comfortableness database 325. For example, FIG. 13 illustrates an example in which a type "large automobile" of the mobility device 1, an environment "sunny" of when the mobility device 1 of the type "large automobile" travels, and travel comfortableness "R131" when traveling on a link with a link ID of "131011" in the mobility device 1 of the type "large automobile" in the environment "sunny" are associated with the link with the link ID of "131011" in the generated comfortableness database 325.

In this case, from the generated comfortableness database 325, it is possible to collect the travel comfortableness $R_q$ at the time of traveling on each of the links $L_q$ in a target area in the mobility device 1 of a specific type in a specific environment. According to the collected travel comfortableness $R_q$, it is possible to grasp relatively how high comfortableness each of the links $L_q$ can be traveled with among one or more links in a target area by the mobility device 1 of a specific type in a specific environment. By the above, in a case of moving in a target area in a certain environment, it is possible to grasp which type of mobility device should be used and on which link one should travel in order to move comfortably.

Data Analysis Operation

Figure 14:
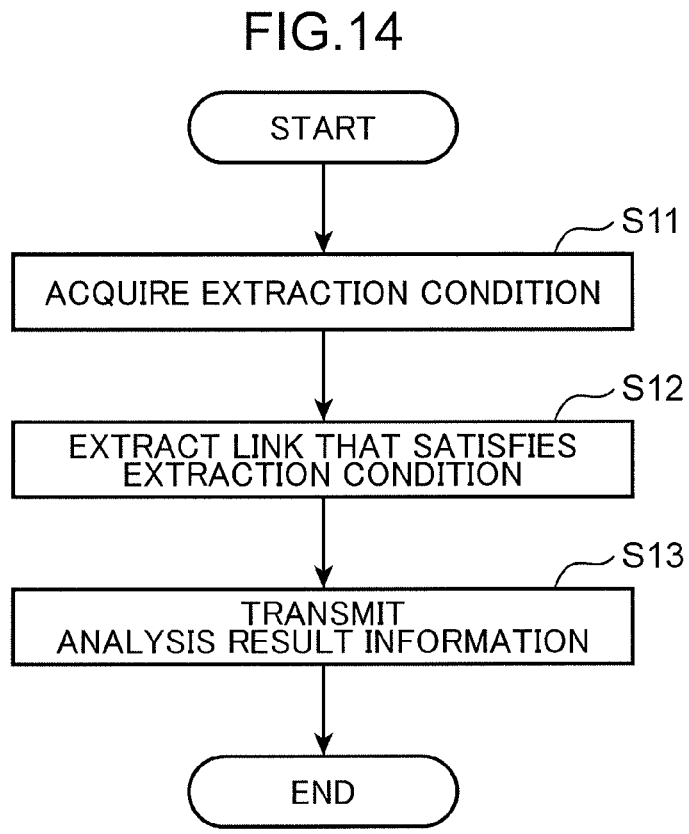
FIG. 14 is a flowchart for explaining data analysis operation of the server device.

Next, data analysis operation of the server device 3 will be described. FIG. 14 is a flowchart for explaining data analysis operation of the server device 3.

First, in step S11, the condition acquisition unit 334 acquires an extraction condition received by the communication unit 31 from the terminal device 2. The terminal device 2 receives input of an extraction condition by an operator, and transmits the input extraction condition to the server device 3. As described above, the extraction condition includes a departure place and a destination of the mobility device 1, a type of the mobility device 1, at least one of a departure time and an arrival time of the mobility device 1, and a condition for identifying travel comfortableness when traveling on a road in the mobility device 1 of the type.

Next, in step S12, the extraction unit 335 extracts at least one link satisfying the extraction condition acquired in step S11 from the link information storage unit 323, the area information storage unit 324, and the comfortableness database 325.

Next, in step S13, the output unit 336 outputs analysis result information including at least one link extracted in step S12 to the communication unit 31. The communication unit 31 transmits the analysis result information to the terminal device 2. The terminal device 2 receives analysis result information transmitted by the server device 3, and displays the received analysis result information. By the above, the terminal device 2 can present analysis result information to an operator.

Second Embodiment

Hereinafter, a second embodiment of the present disclosure will be described. In the first embodiment, an example in which the calculation unit 332 calculates speed comfortableness and straight travel comfortableness, and calculates travel comfortableness by a weighted average value of the speed comfortableness and the straight travel comfortableness is described. In the second embodiment, the calculation unit 332 further calculates environment comfortableness, and calculates speed comfortableness from a weighted average value of speed comfortableness, straight travel comfortableness, and environment comfortableness. The environment comfortableness indicates how comfortable an environment is when traveling on each link in the mobility device 1 of a target type.

Specifically, first, in step S1 (FIG. 11), the acquisition unit 331 refers to a transmission date and time included in state information acquired from the plurality of mobility devices 1 during traveling, and inquires the public server 4 about an environment index corresponding to the transmission date and time by using the communication unit 31. The environment index is an index indicating an environment. For example, the environment index includes a solar radiation amount, a rainfall amount, a snowfall amount, a temperature, and a wind speed. The wind speed may be a wind speed for each wind direction (for example, a wind speed in the east direction, a wind speed in the west direction, and the like), or may be a wind speed that does not depend on a wind direction.

The acquisition unit 331 acquires an environment index corresponding to the transmission date and time received by the communication unit 31 from the public server 4 as an environment index when the mobility device 1 travels. The acquisition unit 331 includes the acquired environment index when the mobility device 1 travels in state information and stores the state information in the state information storage unit 322.

In step S2 (FIG. 11), similarly to the first embodiment, the calculation unit 332 calculates the speed comfortableness $M_q$ and the straight travel comfortableness $N_q$ at the time of traveling on each of the links $L_q$ in the mobility device 1 of a target type. Furthermore, the calculation unit 332 calculates environment comfortableness $Z_q$ at the time of traveling on each of the links $L_q$ in the mobility device 1 of a target type as described below.

Calculation of Environment Comfortableness

Specifically, the calculation unit 332 refers to the link information storage unit 323, the area information storage unit 324, and the state information storage unit 322, and acquires state information transmitted when the mobility device 1 of a target type is traveling on one or more links in a target area.

The calculation unit 332 refers to an environment index included in the acquired state information, and calculates, for each of one or more links in a target area, an average value $U_{jq\_ave}$ of each environment index j of when the mobility device 1 of a target type travels on each of the links $L_q$. Hereinafter, the average value $U_{jq\_ave}$ of the environment indexes j of when the mobility device 1 of a target type travels on each of the links $L_q$ is abbreviated as the average value $U_{jq\_ave}$ of the environment indexes j in each of the links $L_q$.

Note that the calculation unit 332 may exclude state information indicating that a traveling speed of the mobility device 1 of a target type is equal to or less than a predetermined lower limit speed from acquired state information. In this case, information acquired when the mobility device 1 of a target type is forcibly caused to travel at a low speed equal to or less than the lower limit speed or stop due to traffic congestion, signal waiting, or the like can be excluded from state information, and environment comfortableness of when the mobility device 1 of a target type normally travels can be appropriately calculated based on the state information.

Next, the calculation unit 332 calculates comfortableness $X_{jq}$ of an environment indicated by each of the environment indexes j at the time of traveling on each of the links $L_q$ in the mobility device 1 of a target type by using Equation (10) below including the average value $U_{jq\_ave}$ of each of the environment indexes j in each of the links $L_q$.

[Mathematical formula 10]

$$X_{jq} = \frac{1 - (U_{jq\_ave} - U_{j\_ave\_min})}{U_{j\_ave\_max} - U_{j\_ave\_min}} \times 100\% \qquad (10)$$

In Equation (10), $U_{j\_ave\_min}$ represents a minimum value among the average values $U_{jq\_ave}$ of each of the environment indexes j in one or more of the links $L_q$ in a target area. $U_{j\_ave\_max}$ indicates a maximum value among average values $U_{jq\_ave}$ of each of the environment indexes j in one or more of the links $L_q$ in a target area. That is, according to Equation (10), as the average value $U_{jq\_ave}$ of each of the environment indexes j in the link $L_q$ is smaller, the comfortableness $X_{jq}$ of an environment indicated by each of the environment indexes j at the time of traveling on the link $L_q$ in the mobility device 1 of a target type becomes higher. Therefore, the comfortableness $X_{jq}$ of an environment indicated by each of the environment indexes j at the time of traveling on the link $L_q$ in which the average value $U_{jq\_ave}$ of each of the environment indexes j is the minimum value $U_{j\_ave\_min}$ among one or more links in a target area is 100%.

Next, the calculation unit 332 refers to an environment index included in the acquired state information, and calculates, for each of one or more links in a target area, a sample standard deviation $U_{jq\_ssd}$ of each of the environment indexes j when the mobility device 1 of a target type travels on each of the links $L_q$. Hereinafter, the sample standard deviation $U_{jq\_ssd}$ of each of the environment indexes j when the mobility device 1 of a target type travels on each of the links $L_q$ is abbreviated as the sample standard deviation $U_{jq\_ssd}$ of each of the environment indexes j in each of the links $L_q$.

Next, the calculation unit 332 calculates stability $Y_{jq}$ of an environment indicated by each of the environment indexes j at the time of traveling on each of the links $L_q$ in the mobility device 1 of a target type by using Equation (11) below including the sample standard deviation $U_{jq\_ssd}$ of each of the environment indexes j in each of the links $L_q$.

[Mathematical formula 11]

$$Y_{jq} = \frac{1 - (U_{jq\_ssd} - U_{j\_ssd\_min})}{U_{j\_ssd\_max} - U_{j\_ssd\_min}} \times 100\% \qquad (11)$$

In Equation (11), $U_{j\_ssd\_min}$ represents a minimum value of the sample standard deviation $U_{jq\_ssd}$ of each of the environment indexes j in one or more of the links $L_q$ in a target area. $U_{j\_ssd\_max}$ indicates a maximum value of the sample standard deviation $U_{jq\_ssd}$ of each of the environment indexes j in one or more of the links $L_q$ in a target area. That is, according to Equation (11), as the sample standard deviation $U_{jq\_ssd}$ of each of the environment indexes j in the link $L_q$ is smaller, the stability $Y_{jq}$ of an environment indicated by each of the environment indexes j at the time of traveling on the link $L_q$ in the mobility device 1 of a target type becomes higher. For this reason, among one or more links in a target area, the stability $Y_{jq}$ of an environment indicated by each of the environment indexes j at the time of traveling on the link $L_q$ in which the sample standard deviation $U_{jq\_ssd}$ of each of the environment indexes j is the minimum value $U_{j\_ssd\_min}$ is 100%.

Then, as shown in Equation (12) below, the calculation unit 332 calculates a weighted average value of the comfortableness $X_{jq}$ of an environment indicated by each of the environment indexes j and the stability $Y_{jq}$ of an environment indicated by each of the environment indexes j at the time of traveling on each of the links $L_q$ in the mobility device 1 of a target type as the environment comfortableness $Z_q$ at the time of traveling on each of the links $L_q$ in the mobility device 1 of a target type.

[Mathematical formula 12]

$$Z_q = \frac{\sum_{j=1}^{n}((W_{jX} \times X_{jq}) + (W_{jY} \times Y_{jq}))}{\sum_{j=1}^{n}(W_{jX} + W_{jY})} \qquad (12)$$

In Equation (12), $W_{jX}$ is a weighting factor of the comfortableness $X_{jq}$ of an environment indicated by each of the environment indexes j. $W_{jY}$ is a weighting factor of the stability $Y_{jq}$ of an environment indicated by each of the environment indexes j. n represents the number of environment indexes. For example, in a case where state information includes a solar radiation amount and a rainfall amount as environment indexes, the number of environment indexes is two. The weighting factors $W_{jX}$ and $W_{jY}$ are set to an optional value of zero or more such that at least one of the weighting factors $W_{jX}$ and $W_{jY}$ has a value larger than zero.

The weighting factors $W_{jX}$ and $W_{jY}$ (j=1 to n) may be appropriately determined according to which one of the comfortableness $X_{jq}$ of an environment indicated by each of the environment indexes j and the environment stability $Y_{jq}$ indicated by each of the environment indexes j the user of the mobility device 1 emphasizes as comfortableness at the time of traveling of the mobility device 1 based on an experimental value.

For example, in a case where the comfortableness $X_{jq}$ of an environment indicated by each of the environment indexes j is emphasized as comfortableness at the time of traveling of the mobility device 1, the weighting factor $W_{jX}$ (j=1 to n) is preferably set to a value larger than zero, and the weighting factor $W_{jY}$ (j=1 to n) is preferably set to zero.

Then, the calculation unit 332 calculates a weighted average value of the speed comfortableness $M_q$, the straight travel comfortableness $N_q$, and the environment comfortableness $Z_q$ as the travel comfortableness $R_q$ when the mobility device 1 of a target type travels on each of the links $L_q$ as expressed by Equation (13) below.

[Mathematical formula 13]

$$R_q = \frac{(\alpha \times M_q + \beta \times N_q + \gamma \times Z_q)}{(\alpha + \beta + \gamma)} \qquad (13)$$

In Equation (13), $\alpha$ represents a weighting factor of the speed comfortableness $M_q$ larger than zero. $\beta$ represents a weighting factor of the straight travel comfortableness $N_q$ larger than zero. $\gamma$ indicates a weighting factor of the environment comfortableness $Z_q$ larger than zero. The weighting factors $\alpha$, $\beta$, and $\gamma$ may be appropriately determined according to which one of the speed comfortableness $M_q$, the straight travel comfortableness $N_q$, and the environment comfortableness $Z_q$ the user of the mobility device 1 emphasizes as comfortableness at the time of traveling of the mobility device 1 based on an experimental value. For example, in a case where the speed comfortableness $M_q$ is emphasized more than the straight travel comfortableness $N_q$ and the environment comfortableness $Z_q$ and the straight travel comfortableness $N_q$ is emphasized more than the environment comfortableness $Z_q$ as comfortableness at the time of traveling of the mobility device 1, the weighting factor $\alpha$ is preferably set to a value larger than the weighting factor $\beta$ and the weighting factor $\gamma$, and the weighting factor $\beta$ is preferably set to a value larger than the weighting factor $\gamma$ (preferably set so that $\alpha > \beta > \gamma$ is established).

Note that, similarly to the first embodiment, in step S2 (FIG. 11), the calculation unit 332 may calculate, for each of one or more links in a target area, a type of the plurality of mobility devices 1 and travel comfortableness in a time zone in which the plurality of mobility devices 1 travel, based on state information acquired from the plurality of mobility devices 1 traveling on the one or more links. In accordance with the above, in step S3 (FIG. 11), the generation unit 333 may generate the comfortableness database 325 in which a type of the mobility device 1, a time zone in which the mobility device 1 travels, and the travel comfortableness $R_q$ at the time of traveling on each of the links $L_q$ in the type of the mobility device 1 in the time zone calculated by the calculation unit 332 are associated with each of one or more links in a target area.

According to a configuration of the second embodiment, it is possible to more appropriately calculate the travel comfortableness $R_q$ in consideration of not only variation in an average speed, an average angular velocity, an average acceleration, a speed, an angular velocity, and an acceleration when the mobility device 1 travels on each of the links $L_q$ but also an average value of environment indexes and variation in the environment indexes when the mobility device 1 travels on each of the links $L_q$.

Note that, in each of the above embodiments, each constituent element may be implemented by being configured with dedicated hardware or by execution of a software program suitable for each constituent element. Each component may be implemented by a program execution unit (computer) such as a CPU or a processor reading and executing a software program (database generation program, data analysis program) recorded in a recording medium such as a hard disk or a semiconductor memory.

Some or all functions of the device according to the embodiment of the present disclosure are implemented as large scale integration (LSI), which is typically an integrated circuit. These may be individually integrated into one chip, or may be integrated into one chip so as to include some or all of them. Further, circuit integration is not limited to LSI, and may be implemented by a dedicated circuit or a general-purpose processor. A field programmable gate array (FPGA), which can be programmed after manufacturing of LSI, or a reconfigurable processor in which connection and setting of circuit cells inside LSI can be reconfigured may be used.

Further, a part or all of functions of a device according to the embodiment of the present disclosure may be realized by a processor (computer) such as a CPU executing a program (database generation program, data analysis program).

Further, all numbers used above are illustrated to specifically describe the present disclosure, and the present disclosure is not limited to the illustrated numbers.

Further, order in which steps illustrated in the above flowchart are executed is for specifically explaining the present disclosure, and may be any order other than the above order as long as a similar effect is obtained. Further, some of the above steps may be executed simultaneously (in parallel) with other steps.

Note that, in the present disclosure, the first embodiment, the second embodiment, and a variation according to the embodiment of the present disclosure may be optionally combined.

INDUSTRIAL APPLICABILITY

The technique according to the present disclosure is useful for a technique of generating a database because comfortableness at the time of traveling on a road in a predetermined area in a mobility device can be collected for each type of mobility device.

The invention claimed is:

1. A method for solving the problem of a mismatch in ride comfort between different types vehicles and different roads comprising:

using a speed sensor, an angular velocity sensor, and an acceleration sensor on different types of vehicles to detect the speed, angular velocity, and acceleration, respectively, of the different types of vehicles on different roads in a predetermined area;

transmitting data representing the speed, angular velocity, and acceleration of the different types of vehicles on the different roads to a server;

transmitting to the server the type and location of the different vehicles in the predetermined area whose speed, angular velocity, and acceleration are transmitted to the server;

for each of the different roads, determining, based on the speed, angular velocity, and acceleration of the different vehicles on the different roads and for each type of vehicle, the degree of travel comfortableness for each type of vehicle on each of the roads; and generating with the server a database that associates, for each of the roads, the type of vehicles exhibiting travel comfortableness when traveling on each road, wherein the determined travel comfortableness i) is based on a) speed comfortableness determined by each vehicle's average speed on each road in the database, and b) straight travel comfortableness determined by each vehicle's average angular velocity and average acceleration on each road in the database, and ii) increases as the speed comfortableness or the straight travel comfortableness increases, thereby solving the mismatch of different types of vehicles and different roads when the database is used to match the different types of vehicles to the different roads.

2. The method according to claim 1, wherein one of the transmitting operations further includes transmitting information indicating a time of travel of the different types of vehicles, the determining of the travel comfortableness is performed for the different types of vehicles traveling on the different roads in a time zone in which the different types of vehicles travel based on the time of travel of the different types of vehicles in addition to the transmitted speed, angular velocity, and acceleration, and the generation of the database associates, for each of the different roads, the type of different vehicles, the time zone in which the different types of vehicles travel, and the travel comfortableness of the different vehicles when traveling on each of the different roads.

3. The method according to claim 1, wherein one of the transmitting operations further includes transmitting information indicating the environment through which the different vehicles travel on the different roads, the determining of the travel comfortableness is performed for the different types of vehicles traveling through the environment on the different roads based on the environment information in addition to the transmitted speed, angular velocity, and acceleration, and the generation of the database associates, for each of the different roads, the different types of vehicles, the environment information on the environment through which the different types of vehicles travel on the different roads and the travel comfortableness of the different vehicles traveling on the different roads.

4. The method according to claim 1, wherein the determining of the travel comfortableness includes determining the speed comfortableness based on an average speed of each type of vehicle traveling on the different roads and a sample standard deviation of a speed at which each type of vehicle travels on the different roads, and determining the straight travel comfortableness based on an average angular velocity and an average acceleration of each type of vehicle traveling on the different roads, and a sample standard deviation of the angular velocity and the acceleration at which each type of the different vehicles travels on the different roads.

5. The method according to claim 1, wherein the determining of the travel comfortableness includes determining the speed comfortableness based on the average speed of each type of vehicle traveling on the different roads, and determining the travel comfortableness based on the average angular velocity and the average acceleration of each type of vehicle traveling on the different roads, and determining environment comfortableness based on an average value of indexes indicating an environment through which the different types of vehicles travel on the different roads.

6. The method according to claim 5, wherein the determining of the travel comfortableness includes determining the speed comfortableness based on the average speed of travel of each type of vehicle on the different roads and a sample standard deviation of the speed at which each type of vehicle travels on each road, determining the straight travel comfortableness based on the average angular velocity and the average acceleration of travel of each type of vehicle on each road, and a sample standard deviation of the angular velocity and the acceleration at which each type of vehicle travels on each road, and determining the environment comfortableness based on an average value of indexes indicating an environment through which each type of vehicle travels on each road and a sample standard deviation of the index indicating the environment through which each type of vehicle travels on each road.

7. The method according to claim 1, wherein the determining of the travel comfortableness is also based on information obtained by excluding, from the information transmitted by the different vehicles, information indicating that each type of vehicle travels on each road at a speed equal to or less than a predetermined lower limit speed.

8. A device for solving the problem of a mismatch in ride comfort between different types vehicles and different roads comprising:

a communicator configured to receive information on the speed, angular velocity, and acceleration of the different types of vehicles on different roads in a predetermined area detected by a speed sensor, an angular velocity sensor, and an acceleration sensor, respectively, on the different types of vehicles and transmitted by the different types of vehicles to the communicator, and information on the type and location of the different vehicles in the predetermined area from the different vehicles whose speed, angular velocity, and acceleration are transmitted to the communicator;

a memory; and a processor configured to acquire the information received by the communicator, determine for each of the different roads, based on the speed, angular velocity, and acceleration of the different vehicles on the different roads and for each type of vehicle, the degree of travel comfortableness for each type of vehicle on each of the roads, and generate a database and save the database in the memory, the database associating, for each of the roads, the type of vehicles exhibiting travel comfortableness on each road, wherein the travel comfortableness i) is based on a) speed comfortableness determined by each vehicle's average speed on each road in the database, and b) straight travel comfortableness determined by each vehicle's average angular velocity and average acceleration on each road in the database, and ii) increases as the speed comfortableness or the straight travel comfortableness increases, thereby solving the mismatch of different types of vehicles and different roads when the database is used to match the different types of vehicles to the different roads.

9. A non-transitory computer readable storage medium storing a database generation program for solving the problem of a mismatch in ride comfort between different types vehicles and different roads, the program causing a computer to function to:

receive information on the speed, angular velocity, and acceleration of the different types of vehicles on different roads in a predetermined area detected by a speed sensor, an angular velocity sensor, and an acceleration sensor, respectively, on the different types of vehicles and transmitted by the different types of vehicles to the computer;

receive information on the type and location of the different vehicles in the predetermined area from the different vehicles whose speed, angular velocity, and acceleration are transmitted to the computer;

for each of the different roads, determine, based on the speed, angular velocity, and acceleration of the different vehicles on the different roads and for each type of vehicle, the degree of travel comfortableness for each type of vehicle on each of the roads; and generate a database that associates, for each of the roads, the type of vehicles exhibiting travel comfortableness when traveling on each road, wherein the determined travel comfortableness i) is based on a) speed comfortableness determined by each vehicle's average speed on each road in the database, and b) straight travel comfortableness determined by each vehicle's average angular velocity and average acceleration on each road in the database, and ii) increases as the speed comfortableness or the straight travel comfortableness increases, thereby solving the mismatch of different types of vehicles and different roads when the database is used to match the different types of vehicles to the different roads.

10. A data analysis method in a data analysis device that extracts at least one road satisfying an extraction condition from the database generated by the database generation method according to claim 1, wherein the extraction condition includes a type of vehicle and a condition for identifying the travel comfortableness of when traveling on a road in the type of vehicle, the data analysis method comprises:

acquiring the extraction condition;

extracting the at least one road satisfying the extraction condition from the database; and outputting analysis result information including the extracted at least one road.

11. The data analysis method according to claim 10, wherein the analysis result information includes a heat map indicating a relationship between each of the at least one road and the travel comfortableness when traveling on each of the at least one road in a vehicle of a type identified by the extraction condition.

12. A data analysis device that extracts at least one road satisfying an extraction condition from the database generated by the database generation method according to claim 1, wherein the extraction condition includes a type of vehicle and a condition for identifying the travel comfortableness of when traveling on a road in the type of vehicle, the data analysis device comprises:

a condition acquisition unit that acquires the extraction condition;

an extraction unit that extracts the at least one road satisfying the extraction condition from the database; and an output unit that outputs analysis result information including the extracted at least one road.

13. A non-transitory computer readable storage medium storing a data analysis program that extracts at least one road satisfying an extraction condition from the database generated by the database generation method according to claim 1, wherein the extraction condition includes a type of vehicle and a condition for identifying the travel comfortableness of when traveling on a road in the type of vehicle, the data analysis program causing a computer to:

acquire the extraction condition;

extract the at least one road satisfying the extraction condition from the database; and output analysis result information including the extracted at least one road.

14. The method according to claim 1, wherein the traveling comfortableness is calculated based on a combination of the speed comfortableness and the straight comfortableness resulting from weighting.

15. The method according to claim 14, wherein the traveling comfortableness is calculated based on a combination of the speed comfortableness resulting from weighing in accordance with a preference of a user and the straight comfortableness resulting from weighting in accordance with a preference of the user.

16. The method according to claim 1, wherein the traveling comfortableness is calculated as a weighted average value of the speed comfortableness and the straight comfortableness.

17. The method according to claim 16, wherein the traveling comfortableness is calculated as a weighted average value of the speed comfortableness resulting from weighting in accordance with the preference of a user, and the straight comfortableness resulting from weighting in accordance with the preference of the user.

18. The method according to claim 1, wherein the determined travel comfortableness increases as the speed comfortableness, resulting from weighting in accordance with the preference of a user, or the straight travel comfortableness, resulting from weighting in accordance with the preference of the user, increases.

*   *   *   *   *